US012102999B2

(12) United States Patent
Laurent et al.

(10) Patent No.: US 12,102,999 B2
(45) Date of Patent: Oct. 1, 2024

(54) DEVICE AND METHOD FOR HANDLING A PARTICLE SUSPENSION

(71) Applicant: ASTRAVEUS, Paris (FR)

(72) Inventors: Jérémie Laurent, Villeurbanne (FR); Vincent Thisse, Choisy-le-Roi (FR)

(73) Assignee: ASTRAVEUS, Paris (FR)

( * ) Notice: Subject to any disclaimer, the term of this patent is extended or adjusted under 35 U.S.C. 154(b) by 742 days.

(21) Appl. No.: 17/417,537

(22) PCT Filed: Dec. 27, 2019

(86) PCT No.: PCT/EP2019/087062
§ 371 (c)(1),
(2) Date: Jun. 23, 2021

(87) PCT Pub. No.: WO2020/136234
PCT Pub. Date: Jul. 2, 2020

(65) Prior Publication Data

US 2022/0048029 A1 Feb. 17, 2022

(30) Foreign Application Priority Data

Dec. 28, 2018 (EP) .................................... 18306872

(51) Int. Cl.
*B01L 3/00* (2006.01)
*B01F 23/00* (2022.01)
(Continued)

(52) U.S. Cl.
CPC ....... *B01L 3/502715* (2013.01); *B01L 3/0289* (2013.01); *B01L 3/50273* (2013.01);
(Continued)

(58) Field of Classification Search
CPC ............. B01L 3/502715; B01L 3/0289; B01L 3/50273; B01L 2200/0673;
(Continued)

(56) References Cited

U.S. PATENT DOCUMENTS

2005/0282206 A1 12/2005 Michael Corbett et al.
2007/0039866 A1 2/2007 Schroeder et al.
(Continued)

FOREIGN PATENT DOCUMENTS

CN 106199032 A 12/2016
WO WO-2018126082 A1 * 7/2018 ........ B01L 3/502707

OTHER PUBLICATIONS

International Search Report and Written Opinion of the International Searching Authority issued on Mar. 30, 2020 in corresponding International application No. PCT/EP2019/087062; 11 pages.

*Primary Examiner* — Jennifer Wecker
*Assistant Examiner* — Oyeleye Alexander Alabi
(74) *Attorney, Agent, or Firm* — Maier & Maier, PLLC

(57) ABSTRACT

A device for handling a particle suspension, in particular a cell suspension, which includes at least one channel for flowing the particle suspension, a pumping unit configured to move a driving fluid and control element for controlling the pumping unit. Also, a method for handling a particle suspension, which includes flowing the particle suspension in or out of at least one channel using a driving fluid for driving the particle suspension in the channel.

19 Claims, 7 Drawing Sheets

(51) Int. Cl.

| | |
|---|---|
| ***B01F 23/41*** | (2022.01) |
| ***B01F 101/23*** | (2022.01) |
| ***B01L 3/02*** | (2006.01) |
| ***B23Q 17/24*** | (2006.01) |
| ***C12M 1/34*** | (2006.01) |
| ***C12Q 1/04*** | (2006.01) |
| ***C12Q 1/18*** | (2006.01) |
| ***C12Q 1/686*** | (2018.01) |
| ***G01N 21/3577*** | (2014.01) |
| ***G01N 21/359*** | (2014.01) |
| ***G01N 21/39*** | (2006.01) |
| ***G01N 21/45*** | (2006.01) |
| ***G01N 21/64*** | (2006.01) |
| ***G01N 30/12*** | (2006.01) |
| ***G01N 30/68*** | (2006.01) |
| ***G01N 30/70*** | (2006.01) |
| ***G01N 30/72*** | (2006.01) |
| ***G01N 30/88*** | (2006.01) |
| ***G01N 33/00*** | (2006.01) |
| ***G01N 33/18*** | (2006.01) |
| ***G01N 33/50*** | (2006.01) |
| ***G01N 33/543*** | (2006.01) |
| ***G01N 33/68*** | (2006.01) |
| ***G01N 35/04*** | (2006.01) |
| ***G01N 35/10*** | (2006.01) |

(52) U.S. Cl.
CPC .................. *B01L 2200/0673* (2013.01); *B01L 2200/0689* (2013.01); *B01L 2200/141* (2013.01); *B01L 2300/028* (2013.01); *B01L 2300/0681* (2013.01); *B01L 2300/0883* (2013.01); *B01L 2300/14* (2013.01); *B01L 2300/1883* (2013.01)

(58) Field of Classification Search
CPC ....... B01L 2200/0689; B01L 2200/141; B01L 2300/028; B01L 2300/0681; B01L 2300/0883; B01L 2300/14; B01L 2300/1883; B01L 2300/088; B01L 3/502784
See application file for complete search history.

(56) References Cited

U.S. PATENT DOCUMENTS

| | | | |
|---|---|---|---|
| 2012/0149872 | A1 | 6/2012 | Belgrader |
| 2018/0200677 | A1 | 7/2018 | Lee et al. |

* cited by examiner

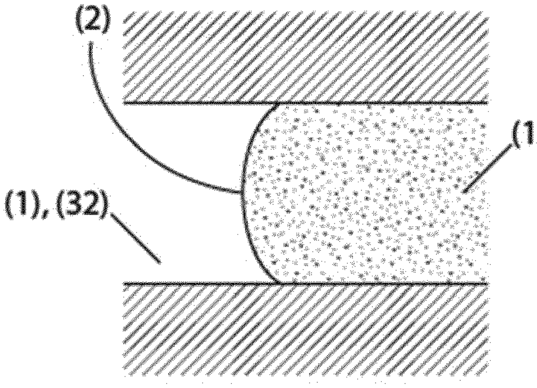
Figure 2.a
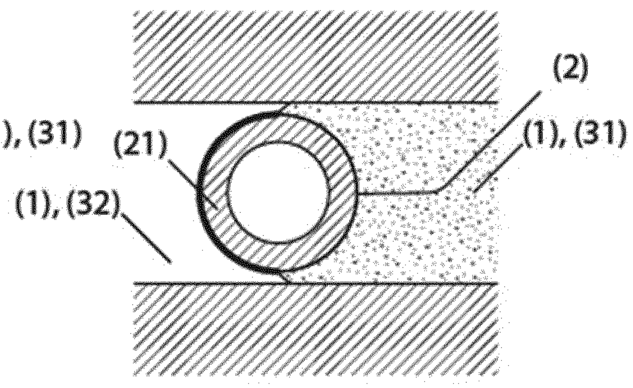
Figure 2.b
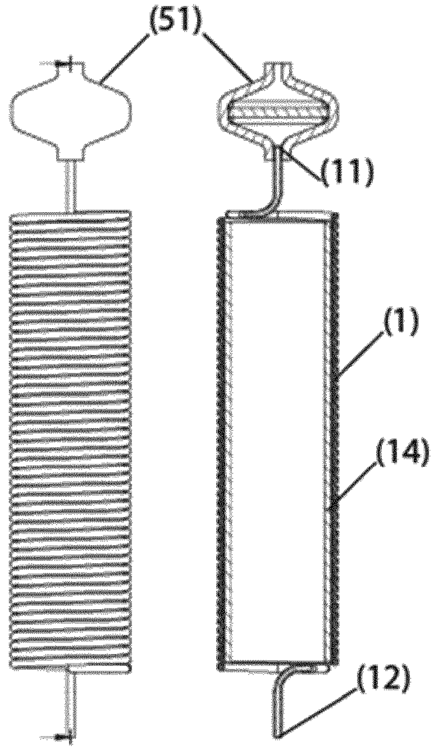
Figure 2.c
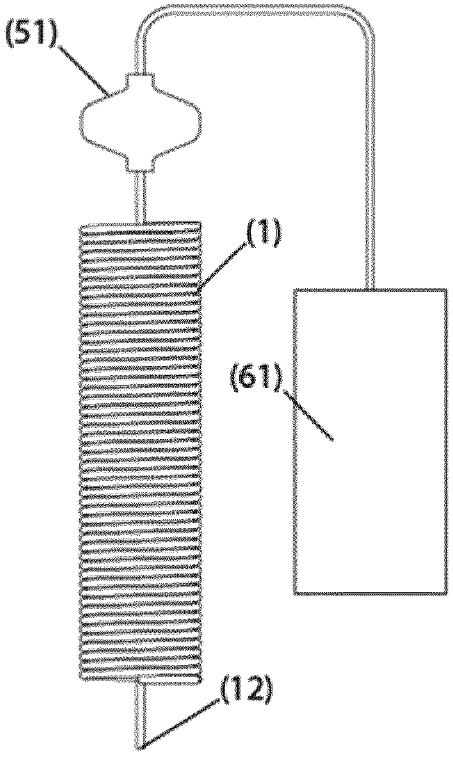
Figure 2.d

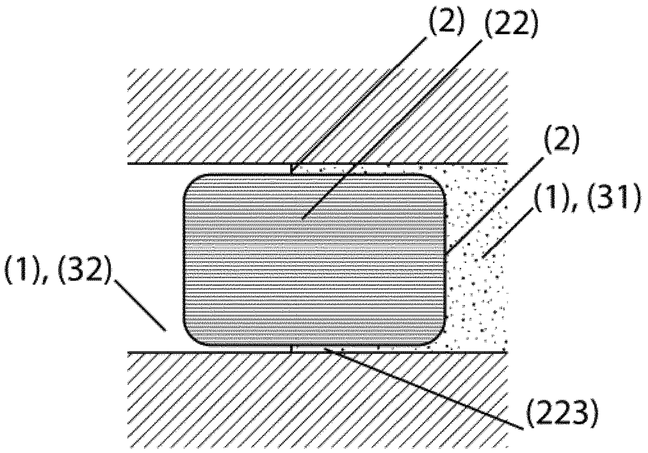
Figure 3.a
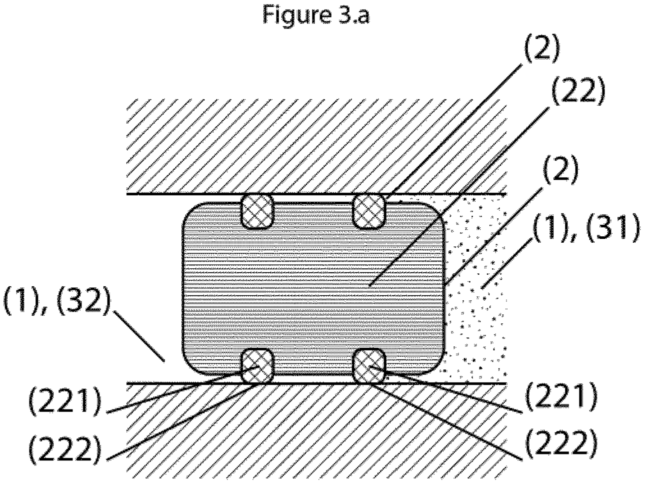
Figure 3.b
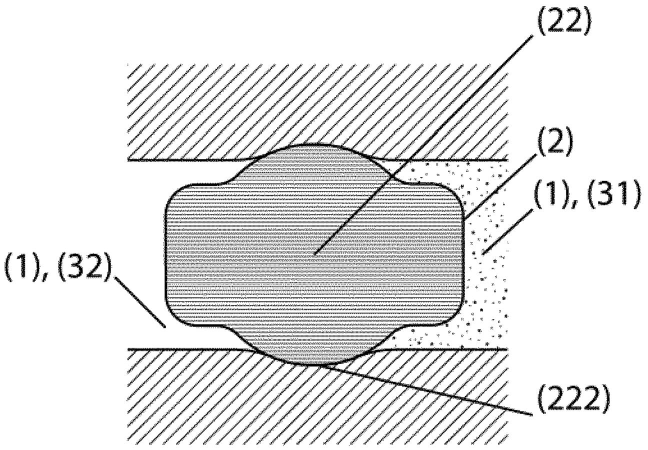
Figure 3.c

DEVICE AND METHOD FOR HANDLING A PARTICLE SUSPENSION

FIELD

The present invention relates to a device and a method for handling a particle suspension, in particular a cell suspension.

BACKGROUND

The handling of particle suspensions is used in many industries, particularly in bioindustries including biopharmaceutical industries. In bioindustries, the yield of the handling of cell suspensions is important, because cells are often expensive material and/or available in limited quantities. The accuracy of the handling of cell suspensions is also important to output a controlled dose of cells, and thus make it possible to standardize and optimize process results. The alteration of the particle distribution in a suspension during handling, and in particular the loss of suspension homogeneity, adversely impacts accuracy by decorrelating transferred volume and transferred cell number. Inaccurate dosing of cells due to improper handling can result in large performance losses in subsequent operations as well as in risks, including potential lethal risks in the biopharmaceutical industry.

Various systems and methods are currently used to handle particle suspensions, in particular for their transfer, freezing, thawing or other applications, which include creating a direct link between devices through a tubing, or using a temporary container such as a deformable bag, a syringe, a tube, a vial, a flask, a pipette. With such systems and methods, the composition and homogeneity of the particle suspension are frequently altered due to losses and aggregation of particles induced by sedimentation, resulting in variable and often poor yield. In addition, such systems and methods are generally not satisfactory in terms of simplicity of use, accuracy, protection of the particle suspension, temperature control.

It is these drawbacks that the invention is intended more particularly to remedy by proposing a device and a method for handling a particle suspension, in particular a cell suspension, which enable improvement in the yield and accuracy of particle suspension handling.

SUMMARY

For this purpose, a subject of the invention is a device for handling a particle suspension, in particular a cell suspension, comprising:

- at least one channel for flowing the particle suspension, wherein the channel has an average cross-section comprised between 0.1 $mm^2$ and 9 $mm^2$ and a standard hydraulic resistance of less than $10^{13}$ $Pa \cdot s/m^3$, wherein at least a portion of the channel representing half of the length of the channel is compacted in such a way that the largest distance between two points of the volume occupied by the portion of the channel is less than half of the total length of the channel;
- a pumping unit configured to move a driving fluid for driving the particle suspension in the channel, wherein the driving fluid is separated from the particle suspension by an interface;
- control means for controlling the pumping unit as a function of the position of the interface along the channel, the position of the interface being monitored and/or, in the case of an incompressible driving fluid, determined from the volume of the driving fluid injected in the channel by the pumping unit.

Thanks to the invention, robust and important improvement in the yield and accuracy of particle suspension handling are obtained. In particular, the device according to the invention makes it possible to limit particle aggregation by spatial segregation and limitation of sedimentation height, and by allowing efficient and homogeneous mixing and re-suspension relying on inertial lift effects. This is achieved by substituting ordinary reservoirs used for particle suspension handling by a compacted channel with a well-chosen cross section and arrangement.

The relatively small channel cross section limits the typical height over which sedimentation can occur and as such the related particle re-concentration and risks of aggregation. In addition, the reduced cross section of the channel compared to ordinary means for handling suspensions results, at the flow rates used in the applications, in much stronger inertial lift forces than sedimentation forces, allowing for efficient particle resuspension and displacement.

In particular, the situation where a large amount of particles travels near the wall of the particle suspension container is efficiently avoided. Such a situation often occurs due to sedimentation and low inertial lift effects with ordinary devices and methods, resulting in low yields and high induction of heterogeneity in the output as many particles travel slower than the average flow velocity.

In the invention, the specific shape and arrangement of the compacted channel is combined with control means for controlling a pumping unit configured to move a driving fluid for driving the particle suspension, wherein the driving fluid is separated from the particle suspension by an interface. Such a controlled driving fluid makes it possible to displace the particle suspension in the compacted channel without inducing mixing or dilution with the driving fluid, and with an accurate monitoring of the displaced volume of the particle suspension.

Within this disclosure, "interface" means a separation between two different fluids adjacent in a channel, i.e. between the particle suspension and the driving fluid. This separation may be a material such as a gasket, a membrane, a filter, a particle or any other separation mean able to be displaced in the channel, such as materials shown on FIG. 2*b*, 3*a*, 3*b* or 3*c*. This separation may be the contact surface between the particle suspension and the driving fluid. This contact surface is self-defined as a surface with minimal energy with a contact angle on the channel according to Laplace law and wetting properties of fluids on channel. In a cylindrical channel, this surface is a spherical cap, as shown on FIG. 2*a*.

According to one embodiment, the driving fluid is immiscible with the particle suspension medium. In this case, the interface between the driving fluid and the particle suspension is formed by a contact surface between the driving fluid and the particle suspension. In one embodiment, the immiscible driving fluid is air, or an oil mixture having a solubility in water at 20° C. of less than 10 mg/mL.

According to one embodiment, the driving fluid is compressible, preferably the driving fluid is a gas. With a compressible and immiscible driving fluid, which is usual with gases, particle suspension may be displaced with a simple pumping unit controlling pressure not volume, without modification of composition of particle suspension.

According to another embodiment, the driving fluid is miscible with the particle suspension medium. In this case, the device advantageously comprises a fluid driven gasket in the channel, in such a way that the interface between the driving fluid and the particle suspension is formed by the fluid driven gasket positioned between the driving fluid and the particle suspension.

In the case where the interface between the driving fluid and the particle suspension is formed by a contact surface between the driving fluid and the particle suspension, without the presence of a fluid driven gasket, the inlet of the channel is advantageously connected to a filter having a pore diameter less than or equal to 1 μm, preferably less than or equal to 0.5 μm, more preferably less than or equal to 0.2 μm, so as to prevent contamination of the handled particle suspension.

According to one embodiment, the device comprises calibrated volumetric graduations along the channel establishing a relationship between a position along the channel and a displaced volume of the particle suspension. In this embodiment, the position of the interface along the channel can be monitored and linked to a displaced volume of the particle suspension thanks to the calibrated volumetric graduations.

In the case where the device comprises calibrated volumetric graduations, the channel is advantageously transparent or translucent.

In some cases, the device is used manually by operators and a visual inspection allows the estimation of the displaced volume of the particle suspension in a quick manner Such situation includes for example manual manufacturing steps of bioengineered cells. The transparency, or translucency, of the channel allows a visual monitoring of the interface, while the calibrated volumetric graduations give access to an estimation of the displaced volume of the particle suspension. The calibrated volumetric graduations may be, for example, lines and numbers on the outside surface of the channel. In one embodiment, the device comprises at least five calibrated volumetric graduations along the channel length.

It is highlighted that in many embodiments, in particular those using commercially available tubing to form the channel, the dimensional accuracy of the resulting channel is found to be insufficient for volumetric graduations to be based solely on a linear measurement along the channel length and a calculation based on the nominal cross-section of the channel. Then, any volumetric measurement based on the interface position has to rely on previously performed dedicated calibration, based on a dedicated calibration procedure.

According to one embodiment, the driving fluid is a compressible fluid, in particular a gas, for example air. In this case, the calibrated volumetric graduations are put in place along the channel by pre-testing the device with the driving fluid so as to correlate a position of the interface with a displaced volume of the particle suspension.

According to another embodiment, the driving fluid is an incompressible fluid such as a liquid, for example an oil mixture. In this case, the displaced volume of the particle suspension can be determined directly from the volume of the driving fluid injected in the channel by the pumping unit. Thus, in this embodiment, calibrated volumetric graduations are not required, the information of volume of the driving fluid injected in the channel being sufficient to determine the position of the interface along the channel.

According to one embodiment, the position of the interface along the channel is monitored visually.

According to another embodiment, the position of the interface along the channel is monitored by means of a tracking system.

According to one embodiment, the cross section of the channel is constant over at least part of the length where the interface separating the particle suspension from the driving fluid is displaced. In one embodiment, the cross section of the channel is circular.

According to one embodiment, over at least 10% of its length, the channel is curved with a radius of curvature comprised between 2 mm and 50 mm.

According to one feature, the channel is configured to sustain a pressurization with water of at least 0.5 bars above the ambient pressure without breakage and with a leak or permeation flow of the channel inferior to 60 μg/min per mL of the total channel volume filled with water.

According to one embodiment, one end of the channel is connected, possibly via a filter, to the pumping unit, wherein the pumping unit may be for example a pump, a pressure controller or a syringe, capable of creating a pressure variation of at least 0.5 bar. According to one embodiment, the inlet of the channel is connected to the pumping unit.

According to one embodiment, the device comprises a fluid-tight container filled with a high thermal inertia fluid, such as water, the channel being placed within the fluid-tight container.

According to one embodiment, the channel is contained within a layer of thermally insulating material.

According to one embodiment, the material of the channel is configured to sustain exposure to a temperature down to −70° C., preferably down to −140° C.

According to one embodiment, the channel is configured such that, when the channel is filled with a 10% solution of DMSO in water and left at 20° C. and ambient pressure (1 bar) for six hours, said solution when recovered still contains approximately 10% of DMSO with a +/−1% accuracy.

According to one embodiment, the outlet of the channel is connected to a medical needle having an internal diameter comprised between 1 mm and 100 μm.

According to one embodiment, the device comprises at least two channels connected to a manifold at their outlets. According to one embodiment, each channel connected to the manifold is further connected to an individual pumping unit, such as a pump, a pressure controller or a syringe, or equipped with a valve at its inlet or at its outlet.

Within the frame of the invention, the diameter of the particles of the particle suspension is preferably comprised between 1 μm and 200 μm.

The particles of the particle suspension may be, notably, living cells, erythrocytes, platelets, aggregates of living cells, aggregates of living cells and other compounds, tissue or organ fragments, etc.

Another subject of the invention is a method for handling a particle suspension, in particular a cell suspension, comprising flowing the particle suspension in or out of at least one channel by means of a driving fluid for driving the particle suspension in the channel, wherein the driving fluid is separated from the particle suspension by an interface, wherein the channel has an average cross-section comprised between 0.1 $mm^2$ and 9 $mm^2$ and a standard hydraulic resistance of less than $10^{13}$ $Pa\cdot s/m^3$, and at least a portion of the channel representing half of the length of the channel is compacted in such a way that the largest distance between two points of the volume occupied by the portion of the channel is less than half of the total length of the channel, the method comprising moving the driving fluid by means of a pumping unit and controlling the pumping unit as a function of the position of the interface along the channel, the position of the interface being monitored and/or, in the case of an incompressible driving fluid, determined from the volume of the driving fluid injected in the channel by the pumping unit.

According to one embodiment, the flow rate for flowing the particle suspension in or out of the channel is, for at least one period of one second, greater than $Kq*S^{3/2}$ mL/s, where Kq is equal to ⅓ $mL/s/mm^3$ and S is the average cross section of the channel expressed in $mm^2$.

According to one embodiment, the step of flowing the particle suspension in or out of the channel is carried out by applying pulses of flow in opposite directions in the channel, each pulse having a duration of at least one second and a flow rate greater than $Kq*S^{3/2}$ mL/s, where Kq is equal to ⅓ $mL/s/mm^3$ and S is the channel average cross section expressed in $mm^2$. Such pulses of flow make it possible to maintain the particles in suspension or improve the suspension homogeneity, even for long handling periods or long residency time of the suspension in the channel.

In the present invention, the following terms have the following meanings:

"Longitudinal fiber" refers to the centered longitudinal axis of a considered fluidic element or, when the longitudinal axis of the fluidic element is not well defined, the direction of the flow in the fluidic element during flow operations.

"Cross-section" refers to the cross section of a considered fluidic element perpendicular to its longitudinal fiber.

"Standard hydraulic resistance" refers in this disclosure to the hydraulic resistance of a considered fluidic element for a flow of water at 20° C., under atmospheric pressure (1 bar), measured at a flow rate of 10 μL/s. It is defined as the ratio between the pressure difference along a section of the fluidic element and the flow rate through the same fluidic element. For a cylindrical channel in laminar flow and according to Poiseuille law, hydraulic resistance writes:

$$R_h = \frac{8\mu L}{\pi R^4},$$

where μ is the dynamic viscosity, L and R are the length and radius of the cylindrical channel Hydraulic resistance is an intrinsic characteristic of a fluidic element, completely defined by its geometry for a given fluid and in laminar flow conditions.

"Average cross section" refers to the cross section of a considered fluidic element determined by calculating the quantity V/L, where V is the volume of the fluidic element and L is the length of its longitudinal fiber.

"Representative diameter" refers to the diameter of a fluidic element computed as two times the square root of the average cross section of said fluidic element divided by Pi.

In the absence of any other specifications, ambient temperature is 20° C. and ambient pressure is 1 bar for all parameter measurements. More generally, the above ordinary conditions are assumed for all parameter measurements unless otherwise specified.

DESCRIPTION OF THE DRAWINGS

Features and advantages of the invention will become apparent from the following description of embodiments of a device and a method for handling a particle suspension according to the invention, this description being given merely by way of example and with reference to the appended drawings in which:

FIGS. 2*a* to 2*d* are views of devices according to embodiments of the invention configured to use air as a driving fluid.

FIGS. 3*a* to 3*c* are views of devices according to embodiments of the invention equipped with a driving liquid and a fluid driven gasket.

DETAILED DESCRIPTION

Figure 1:
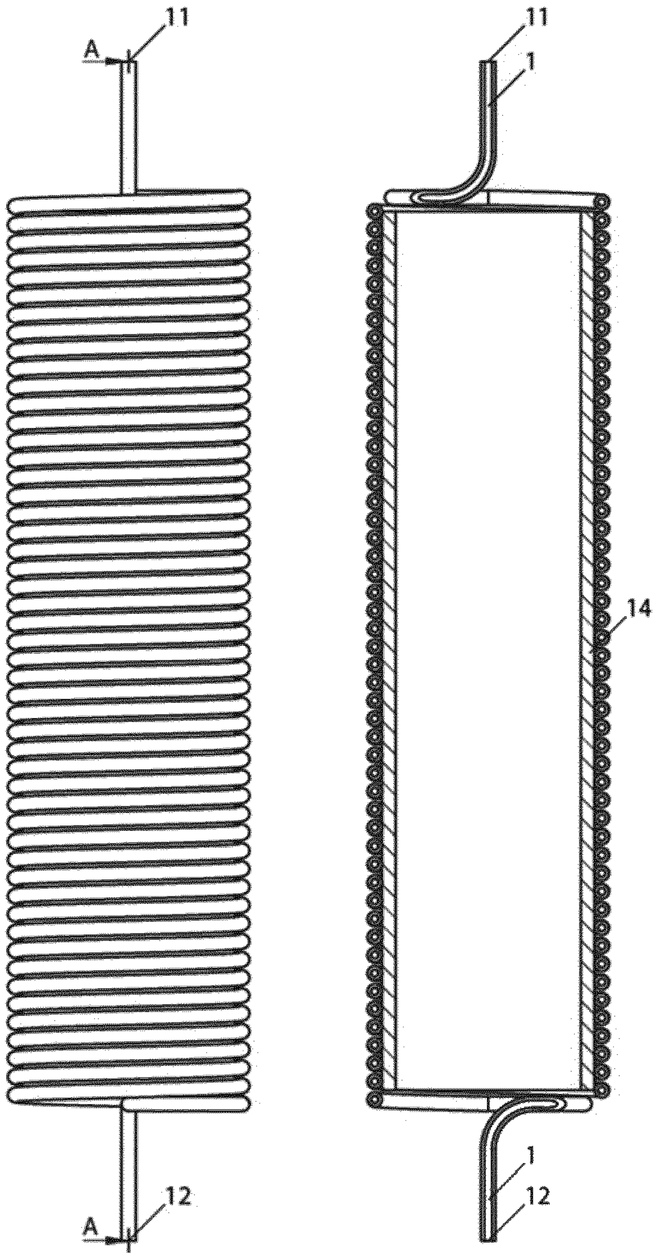
FIG. 1 is a side view and a cross section of a device according to an embodiment of the invention where the channel is compacted in the form of a coil.

General Particle Suspension Handling (FIG. 1)

The device according to the invention comprises a channel 1 having an inner volume V and a length L of its longitudinal fiber. At one end, the channel 1 is terminated by an inlet 11, and at its other end, the channel 1 is terminated by an outlet 12. At any given point along its length direction, the channel 1 has a cross-section of surface area S, a diameter D corresponding to the largest distance between two points in the same cross section, and a dimension H calculated as S/D.

In advantageous embodiments, the volume V is greater than 10 μL so as to allow the handling of a sufficient amount of particle suspension. It is noted that volumes smaller than the total volume of the channel can be handled with the device by varying the extent to which it is filled.

In the embodiment shown in FIG. 1, the channel 1 of the device exhibits a compacted coiled structure, so that its length L is much greater, i.e. at least twice greater, than the largest distance between two points of the volume occupied by the channel. The compaction of the channel is necessary for the ergonomics. Indeed, the channel length L is typically large compared to, for example, the dimension of the hands of an operator. The compaction of the channel also reduces the risk of entanglement or collision.

The suspension viscosity, flow rate and other conditions should not result in excessive pressure creating risks of leaks or permeation. In particular, a handling pressure higher than 10 bars should generally be avoided and the standard hydraulic resistance of the channel should be less than $10^{13}$ $Pa \cdot s/m^3$, as most particle suspensions are more viscous than water and flow rates greater than a few μL/s are often necessary, notably to induce strong inertial lift effects. Lower values of the standard hydraulic resistance are generally preferable. For instance, a tubular channel of radius 1 mm and length 10 m has a hydraulic resistance around 2.5 $10^{10}$ $Pa \cdot s/m^3$ is suitable. A tubular channel of radius 0.1 mm and length 10 m has a hydraulic resistance around 2.5 $10^{14}$ $Pa \cdot s/m^3$ is not suitable: pressure required to displace particle suspension would not be manageable in the device.

The channel cross-section is additionally carefully chosen to provide, at the flow rates of the application, favorable effects and in particular inertial lift effects dominant over sedimentation effects when flow is applied, so as to achieve a high performance handling of the suspension. The preponderance of inertial lift effect over sedimentation effect is crucial, as the situation otherwise experienced is that a large fraction of particles travels, due to sedimentation, near vessel walls where their velocity, due to the locally lower velocity of the flow, is slow and in particular much slower than the average flow. With a large fraction of particles travelling much slower than the average flow, the medium of the suspension is ordinarily depleted of particles during the flow, leading to important yield loss in terms of recovery of particles. Additionally, the homogeneity of the recovered suspension is affected. To achieve high transfer performance, the invention relies on a predictive modelling to ensure inertial lift effects are much stronger than sedimentation during transfers. Using estimates of both forces derived from published research documents, a formula can be derived, which approximates the ratio between the typical magnitude of inertial lift forces over spherical particles in a constant circular cross section and the sedimentation forces. This formula (1) is:

$$\frac{\langle F_L \rangle}{\|F_S\|} = K \frac{\rho_m Q^2 R_p}{g\, D_H^6 \Delta\rho}$$

$<F_L>$ is the typical magnitude of inertial lift forces, $\|F_S\|$ is the typical value of sedimentation forces, K is a dimensionless constant, $\rho_m$ is the suspension medium density, Q is the volumetric flow rate, $R_p$ is the radius of the suspended particle, g is the gravity acceleration or the equivalent acceleration, $D_H$ is the diameter of the cross section, $\Delta\rho$ is the density difference between the particle and the suspension medium.

From the above formula (1), it can be seen that the diameter of the cross section is the most impactful parameter, so that adjusting the cross-section dimensions is the most powerful approach to increase the magnitude of inertial lift forces relative to sedimentation forces. Additionally, it can be seen that other approaches such as reducing the difference in density between the suspension medium and particles are much less effective. The formula (1) also shows that there is an abrupt transition between small circular cross sections resulting in dominant inertial lift effects and larger circular cross sections of channels resulting in dominant sedimentation. This indicates that the maximum value of the diameter of the cross section of the channel making it possible to obtain dominant inertial lift forces is well defined. Additionally, the ratio of powers in the formula (1) between the diameter of the cross section, the flow rate and the size of particles indicates that the maximum value of the diameter of the cross section to have stronger inertial lift forces than sedimentation is relatively robust to changes of flow rate and particle radius.

For example, if the diameter of the channel is chosen as half the hydraulic diameter where the ratio of the formula (1) is equal to 1 in a given application, the ratio of the formula (1) equals 1/64, meaning inertial lift forces are approximately 64 times stronger than sedimentation forces. If the device is used in a similar application at a twice slower flow rate, the ratio equals 1/16 and inertial lift forces are still largely predominant. If the device is used at the original flow rate but with twice smaller particles, the ratio equals 1/32 and here also inertial lift forces are still largely predominant. In summary, if the diameter of the channel is chosen as a fraction such as a tenth, a quarter, a third or a half of the "critical" diameter which would result in a considered application in equal intensity of sedimentation and inertial lift forces according to formula (1), not only will inertial lift effects be much stronger than other effects in the considered application but also in a large range of applications with different flow rates and particle sizes.

As a result, a range of cross-sections offering a robust dominance of inertial lift effects for a large range of applications can be determined numerically and confirmed experimentally. The lower end of this range is set by:

- ensuring the absence of clogging risk, i.e. the cross section should not contain regions where parallel edges are separated by less than three times the particle radius;
- ensuring that shear rates are not likely to induce damages to particles; in the case of a cell suspension, shear rates should remain less than $10^6$ $s^{-1}$ over the majority of the channel, and preferably less than $10^5$ $s^{-1}$ in the entire channel;
- ensuring that turbulence is not likely to induce damages to particle; in the case of living cell suspensions, the Kolmogorov length should be kept much greater than the diameter of the cells in the majority of the channel, ideally in the entire channel;
- ensuring the hydraulic resistance is not too high.

In order to robustly provide dominant inertial lift effects over sedimentation effects for the handling of typical particle suspensions at typical application flow rates, the average cross-section of the channel should be comprised between 0.1 $mm^2$ and 9 $mm^2$, preferably between 0.1 $mm^2$ and 4 $mm^2$, more preferably between 0.1 $mm^2$ and 2 $mm^2$.

Large regions of the channel 1, having a cross section significantly greater than an average cross section, are limited to the smallest possible fraction of the channel length and the smallest possible difference with the average cross section. Indeed, regions of the channel with a cross section significantly greater than an average cross section may not have sufficiently strong shear rate near walls and inertial lift forces on particles to efficiently recollect particles, under flow conditions allowing strong inertial lift and resuspension effects in other parts of the channel. In addition to representing potential particle traps, such regions can result in increased risks of bubble formation or capture, and create difficulties to flush subvolumes of these regions resulting in risks of cross-contamination or undesired mixing.

To limit these issues efficiently, the channel volume should not comprise any segment representing more than 5% of the channel volume V having an average cross section of such segment greater than four times the average cross section of the entire channel Preferably, the channel volume should not comprise any segment representing more than 1% of the channel volume V characterized by an average cross section of such segment greater than four times the average cross section of the entire channel.

The orientation of the longitudinal axis or longitudinal fiber of the channel is maintained on the largest possible part of its length with a relatively small angle to a virtual horizontal plane. This feature of the invention makes it possible, by aligning the virtual horizontal plane with the actual horizontal plane during use of the device, and with respect to the gravity and similar forces encountered, to have the direction of sedimentation forces which makes a small angle with respect to the channel cross-section. As the cross-section of the channel is reduced, this limits the height over which sedimentation can occur, and thus notably the risk of particle accumulation and aggregation resulting from particle sedimentation and re-concentration related to initial particle concentration and height over which sedimentation occurs.

The increase in the sedimentation height, when the channel longitudinal fiber and the direction of sedimentation forces are aligned, is related to the tangent of the angle formed between the direction of the channel longitudinal fiber and the plane perpendicular to the direction of sedimentation forces, i.e. the horizontal plane; then, the angle between the channel and the horizontal plane should be, as rarely as possible along the channel length, greater than 75°, which would result in a tangent function value of approximately 3.7, meaning a local sedimentation height approximately 3.7 times greater than the cross section smallest dimension, which is the minimal value of the sedimentation height with a given cross section if the channel has a circular cross section or if the channel orientation is adapted to have the smallest dimension of the cross section aligned with the vertical axis. Because in practice it is preferable to have a tolerance for the horizontal alignment of the virtual horizontal plane of the device of 5° or more, it is preferable that, on the greatest possible part of the channel length, the angle between the channel longitudinal axis and the virtual horizontal plane be smaller than 70°. In particular, it can be estimated that, over at least 50% of the length of the channel, the channel longitudinal axis should form an angle smaller than 70° with a virtual horizontal plane. It is preferable that the portion over which the angle with the virtual horizontal plane is kept under a maximum value be maximized to greater values when possible and that the maximum value of this angle over this domain be minimized when possible.

In some preferred embodiments, the channel sustains a pressurization with water at least 0.5 bars above the ambient pressure. This is functionally important because 0.5 bars pressurization is obtained in ordinary operations so that such pressurization should not result in rupture or important permeation across the channel walls to avoid spillage risk and risks of alteration of the suspension. In particular, under such pressurization conditions, the leak or permeation flow should be inferior to 60 μg/min per mL of total channel volume filled with water. Additionally, such pressurization should preferably not result in a variation of the channel volume V greater than 10% of V in order to avoid losing accuracy over the suspension handling due to such volume changes. It is of primary importance that no plastic deformation or fatigue occurs during the use of the device to avoid significant loss of accuracy in the measurement of the displaced volume based on the interface position. As such, in preferred embodiments, the tube deformation rate during use (i.e. at a pressure of use), should be much smaller than the yield deformation rate of the material and the material should be chosen with an elastic behavior with very low, ideally no, viscous properties.

Resistance to higher pressure, lower leaks or permeation flow rates under pressurization, and smaller variations of the channel volume during pressurization, are generally preferable.

Another characteristic of the invention is to provide an interface maintained between the particle suspension and the driving fluid occupying the rest or at least a part of the remaining volume of the channel not occupied by the particle suspension. The presence of a driving fluid is required in the invention, because the compaction of the channel results in the impossibility to use a flexible piston to drive the fluid motion similarly to a syringe piston due to the rapid build-up of friction forces on channel walls with channel changes of direction due to compaction. Maintaining an interface between the driving fluid and the particle suspension is essential to avoid dilution, mixing or cross contamination of the particle suspension due to the mixing induced by the velocity profile. Indeed, in the absence of such an interface, the flow being faster toward the core of the channel cross section, convective mixing between the driving fluid and the particle suspension would occur. To allow this interface to be maintained, in particular when the particle suspension is flowing, it is preferable that the cross section of the channel does not vary or varies continuously along the length of the channel. In particular, it is preferable to have a constant cross section over the largest possible part of the channel length. It is also preferable that the cross section of the channel has smoothed edges and does not comprise internal angles smaller than 60°, in order to reduce risks of mixing and cross-contamination related to surface tension or more generally adherence of the driving fluid or the particle suspension components to the channel walls.

Compaction Support or Fixture

In embodiments, it is generally preferred that a support 14 be used to support the compacted channel portion, for example a rigid cylinder can be used and glued to the channel, for example made of a tubing. The tubing can also, for example, be glued in its compacted shape, with glue holding its shape. The tubing can also be coiled within a container with a cylindrical or other ergonomic outer border. The tubing can also be affixed to a support by means of regularly spaced clamps. In other embodiments, the channel is formed by one or several rigid bounded parts, possibly suppressing the need for fixtures. Such means of maintaining the shape of the channel increase the ergonomics of the device, notably by avoiding risks of accidental decompaction of the channel. Additionally, maintaining the arrangement of a portion of the compacted channel standardizes the geometry in which the flow occurs and, as such, geometry-dependent effects impacting transfer, e.g. flow patterns, orientation of sedimentation forces with respect to the channel orientation, are also standardized.

Compaction Repeated Pattern

In embodiments of the invention, it is generally preferred that the channel portion be compacted with a periodic repetition of a pattern, such as repetition of loops in a coil or a zig-zag pattern with a repetition of horizontal segments connected by bends at their extremities. Although the periodic repetition accuracy does not in this case need to be perfectly accurate, the best similarity of repeated portions should be sought in particular in terms of radius of curvature. Indeed, the repetition of a compaction pattern makes the suspension flow conditions, in particular with respect to Dean flow and the direction of sedimentation, repeatedly similar during its travel along the channel. As a result, the behavior of the suspension in the device is simplified and the handling is more homogenous as fractions of the suspension travelling across a greater length of the channel do not experience different flow conditions than those travelling through a smaller fraction of this length. In this respect, it is preferable that the repeated pattern covers the greatest possible length of the channel, and that the pattern itself be repeated the greatest possible number of times over the channel length, in particular in the case where the repeated pattern comprises variations in the curvature or orientation of the tubing with the virtual horizontal plane. In particular, in a preferred set of embodiments, the channel 1 is compacted with repeated patterns representing at least half of its length, preferably on at least three quarters of the channel length. Additionally, in a preferred set of embodiments, the channel 1 is compacted with repeated patterns, where a compaction pattern is repeated at least 4 times over the channel length, preferably at least 8 times over the channel length.

Radius of Curvature

In embodiments, it is generally preferred that the device allows, at the flow rates and other conditions of the application, for the strongest possible magnitude of Dean flow. Indeed, Dean flow provides particle suspension mixing, which is favorable to increase or maintain the homogeneity of the cell suspension. To increase the magnitude of Dean flow, the radius of curvature of the channel 1 median fiber, which is characteristic of its compaction, is minimized Depending on the channel materials and manufacturing means, the channel median fiber radius of curvature typically has a minimum value which is expressed as a multiple of the channel representative diameter. Additionally, extreme values of the radius of curvature are found to increase the complexity of the compaction for a device of a given volume, which increases manufacturing complexity and costs. In some preferred embodiment, the channel 1 has, over at least 10% of its length, a radius of curvature inferior to 30 times the channel representative diameter, preferably a radius of curvature inferior to 20 times the channel representative diameter, and more preferably a radius of curvature inferior to 15 times the channel representative diameter.

Depending on the particle suspension properties, it may be necessary to avoid too low curvature radius to avoid that sedimentation forces related to the centrifugal flow become stronger than inertial lift forces. The estimate of the ratio between these forces can be derived using formula (1) by replacing g by the centrifugal acceleration gear which can be derived from formula (2):

$$g_{cent} = K_H \frac{Q^2}{R_c D_H^4}$$

Where $K_H$ is a dimensionless constant depending primarily on the shape of the channel cross-section, Q is the flow rate, $R_c$ is the local curvature radius of the channel and $D_H$ is its hydraulic diameter.

Formula (3) can thus be derived by replacing gin formula (1) by the expression of $g_{cent}$ obtained in formula (2):

$$\frac{\langle F_L \rangle}{\langle F_{cent} \rangle} = \frac{K}{K_H} \frac{\rho_m R_p R_c}{D_H^2 \Delta\rho}$$

Where $\langle F_{cent} \rangle$ is the value of the centrifugal sedimentation forces. It is noted from formula (3) that the flow rate has no direct contribution, according to this estimate, to the balance of sedimentation induced by centrifugal flow and inertial lift forces, highlighting the importance of a correctly designed device. It can also be noted that reducing the hydraulic diameter increases the relative importance of the role of inertial lift forces.

Using formula (3), it is possible to check for which range of parameters inertial lift effects remain dominant. It is possible to determine that when $R_c$ is greater than $D_H$, inertial lift forces are dominant in a large range of applications. It is further possible to determine that, when $R_c$ is greater than twice $D_H$, inertial lift forces are dominant in a larger range of applications. Further, when $R_c$ is greater than five times $D_H$, inertial lift forces are dominant in most applications, and when Re is greater than ten times $D_H$, inertial lift forces are dominant in almost all applications.

Thus, in preferred embodiments, a minimal radius of curvature equal to twice the cross-section diameter is applied on the majority, i.e. at least 50%, of the channel length. Preferably, a minimal radius of curvature 5 times, and more preferably 10 times, the channel diameter is applied on the majority, i.e. at least 50%, of the channel length.

Cleanliness, Packaging and Sterility

In embodiments, it is generally preferred that the device be clean of residues of particles susceptible to contaminate the handled particle suspension. As such, in some preferred embodiments, the channel of the device is clean and, in particular, such that when flushing the channel of the device at 0.5 bar with a volume of water at 20° C. equal to that of the channel, less than 1 particle of diameter greater than 10 μm can be measured per μL in the recollected flushing water. In some preferred embodiments, the channel 1 is sterile. In order to facilitate maintaining the cleanliness or the sterility of the device prior to use, the device is packaged within a sealed container such as thermally welded impermeable plastic bag or a thermally welded autoclaving bag. To further facilitate maintaining its cleanness, the device of the invention may contain heat sealable tubing extremities; and/or may be equipped with caps; and/or may be equipped with swabbable valves or other types of septa (septum); so as to allow to seal at least the device fluid ports connected to the output 12 of the channels 1 of the device. In particularly advantageous embodiments, the fluidic ports connected to the output 12 of the channels 1 of the device are equipped with a combination of swabbable valves and caps protecting said valves without provoking their opening. For example, Luer Lock caps without stem can be used.

FIG. 1 depicts a basic embodiment with a cylinder used as a support to maintain the shape of a compacted portion of the channel 1 made from a tube, both being attached by gluing. The tube has a lumen with a circular cross section and constant thickness made of polymer. The angle between the channel longitudinal fiber and the virtual horizontal plane, corresponding in this picture to the horizontal axis of the drawing, is kept on the majority of its length inferior to 5°.

Embodiments Prefilled with a Particle Suspension

In some embodiments, the channel 1 is prefilled on a segment with a suspension of particles of diameter comprised between 1 μm and 200 μm. Such embodiments are advantageous in many situations, for example to deliver a particle suspension to a remote location. In such cases, the device stabilizes the particle suspension by limiting the risks of particle aggregation. It additionally increases the recovery yields thanks to strong inertial effects during the suspension output. The output of the device may be more homogeneous than with ordinary means of delivering a particle suspension and, providing a homogeneous filling, it may be more homogeneous than what is achievable after conventional mixing protocols. Thus, the device allows in some cases an immediate and accurate use and in particular dosing of the particles in suspension with a reduced need for processing the suspension, controlling its quality, and for measures of adjusting or confirming the delivered dose. In some embodiments, the particles of the suspensions comprise living cells, erythrocytes, platelets, or aggregates thereof. In some preferred embodiments, the remaining of the channel volume (not occupied by the particle suspension) is occupied by a gas mixture to be used as a driving fluid 32.

Embodiments Equipped to Use Air as a Driving Fluid (FIGS. 2*a* to 2*d*)

An aspect of the invention is the use of a driving fluid 32 and the maintenance of an interface 2 to avoid mixing and cross-contamination between the particle suspension 31 and the driving fluid 32. One approach of doing so within the scope of the invention is to use a gas mixture as a driving fluid 32 and the suspension/gas interface between the particle suspension 31 and the driving fluid 32 as interface 2. This approach is notably advantageous for its relative simplicity of implementation, its efficiency for pressure transmission with a low difference drop between the neighbor extremities of the driving fluid 32 and the particle suspension 31 in the channel, the absence of wear induced by the interface itself, and the potential for efficiently limiting contamination of the particle suspension 31.

In these embodiments, the particle suspension 31 is generally denser than the gas mixture 32 so that it is found generally preferable to orient the device during use vertically with the gas mixture 32 above the particle suspension 31, although the invention may function in other arrangements. It is also found preferable that the cross section of the tubing be rather small to obtain an interface stable over the course of operations, and in particular stable despite gravity or other acceleration forces which could destabilize the interface 2. However, cross-sections in the range recommended above are found to be generally satisfactory to this end.

In these embodiments, it is required to ensure that the surface tension forces at the interface 2 do not result in excessive Laplace pressure difference across the interface 2 which could result in difficult or impossible operations. The surface chemical affinity between the particle suspension medium and the channel walls, as well as the channel cross section and in particular diameter, must be adjusted.

In these embodiments, it is required to ensure that the device is not subjected to excessive vibrations which could destabilize the interface 2. Vibration dampening means such as springs and dampeners may be used in the device fixtures in vibrating environments. However, the destabilization of the interface 2 due to vibrations is not found to occur in ordinary conditions of use.

In these embodiments, the movement of the liquid-gas interface along the channel length during particle suspension flow has to be facilitated. In particular, in some preferred embodiments, the channel surfaces are smooth compared with the channel representative diameter, i.e. its rugosity Ra is less than a tenth of the channel representative diameter, and preferably less than 5% of the channel representative diameter. In some preferred embodiments, the cross-section of the channels is continuous along the channel length over a set of segments representing together at least half of the channel length.

In these embodiments, the compressibility of the gas mixture is a source of advantages and disadvantages. The compressibility can be found to advantageously dampen small flow rates fluctuations and generally to smooth the flow rate profile, which is advantageous in many applications. However, the compressibility of the gas flow rate can create a risk, depending on what the output 12 of the channel is connected to, of undesired flow and notably reflux. The compressibility of the gas mixture can be reduced by increasing the operating pressure, and in particular the driving fluid 32 pressure, to have a stiffer actuation. In certain embodiments, the channel output 12 can be connected via a one-way check valve to a particular port to avoid reflux; in such cases implementation details such as a second port connected to the channel output 12 may be used to fill the channel 1 with the suspension. However, such embodiments may have significant drawbacks, including cell loss in the volume of the check valve which typically have a relatively large cross section. In such embodiments, check valves with cross section matching as closely as possible the cross section of the channel 1 should be used. A feed-back loop on the interface position or displaced volume is the preferred solution to remedy such drawbacks.

The use of a gas mixture as a driving fluid 32 can also create some inconvenience related to the evaporation of part of the particle suspension medium into the driving fluid as well as the dissolution of gas of the gas mixture in the suspension. Although these problems are usually not significantly encountered, the composition of the gas mixture, as well as its pressure, may be adjusted to reduce such exchanges. For example, in the case of an aqueous suspension of particles, it may be found advantageous that the gas mixture comprises a fraction of water vapor to reduce the extent to which water from the particle suspension evaporates into the driving fluid. In the same case, a gas mix saturated with water vapor may be used with care to not nucleate droplets of water in the course of operations outside of the suspension or to condensate excessive amounts of the water vapor of the gas mixture into the particle suspension. Additionally, the other compounds of the gas mixture may be chosen, for example, for their low solubility in the suspension medium.

To reduce these exchanges, a fluid driven gasket 22 consisting in an interface captive particle 21 may be inserted in the channel. Using asymmetric chemical affinity of the particle surface with the suspension medium, for example in the case of aqueous suspensions a particle with a more hydrophobic surface patch than the rest of the surface of the particle, the interface captive particle 21 may be stabilized at the interface 2. As a variant, or in combination, the density of the interface captive particle 21 may be adjusted, for example using hollow core particle, to have it floating at the interface and thus stabilized at the interface. Thus, this interface captive particle 21 may decrease the surface area of the fluid gas exchange interface, in particular during resting times, and thus the exchanges which could occur between the driving fluid and the particle suspension.

As such, in some embodiments, the channel 1 comprises such a gasket 22 made of an interface captive particle 21.

In these embodiments, the flow of the gas mixture in and out of the channel 1 should not be a source of risk of contamination of the particle suspension, for example with dust or specific types of airborne particles. To avoid this risk, several embodiments are proposed within this invention:

In a set of embodiments, the input 11 of the channel 1 is connected to a filter 51 such as a sterile filter characterized by a nominal pore diameter inferior to 1 μm, preferably inferior to 0.5 μm and more preferably of the order of or less than 0.2 μm. The filter 51 is preferably hydrophobic. Thanks to the filter 51, the flow of the driving fluid in and out of the channel 1 safely occurs with respect to particle contamination risks. Additionally, another extremity of said filter 51 can be connected to a gas pump or a pressure controller 61, in particular an electrically or electronically controlled reusable gas pump, allowing to at least partly automate the use of the device and facilitate both the control of the flow rate and the control of the delivered volume. The filter separating the pump or pressure controller from the channel 1 is particularly advantageous given that it is generally complicated to clean and/or sterilize the parts of a pump or pressure controller in contact with the pumped fluid.

In a set of embodiments, the input 11 of the channel 1 is connected to fluid tight bag or to a syringe allowing the movement of the driving fluid 3 in and out of the channel 1 from and to an isolated compartment reducing particle contamination risks and facilitating the operation of the device as a so-called closed system.

Embodiment Equipped with a Driving Liquid

In some embodiments, a liquid is chosen as driving fluid, for example to provide more stiffness to the control of the particle suspension flow.

In some of these embodiments, the driving liquid is immiscible with the particle suspension medium and the particle suspension medium and driving liquid component have low solubility in each other. In these cases, such as when the driving liquid is an oil such as a fluorinated oil and the particle suspension is aqueous, for example, the interface 2 can be formed simply by the interface between the driving liquid 32 and the particle suspension 31. In such cases, similar adaptations such as the connection of the input of the channel to a syringe, a bag or a filter possibly connected to a pump, provide a useful protection against the risks of the driving fluid importing contaminants into the channel or the particle suspension. The scope of application of these embodiments can be limited by the higher hydraulic pressures obtained with the use of oil and the resulting high operating pressures. In some of these embodiments, the channel 1 according to the invention is filled at least in part with an oil mixture characterized by a low solubility in water at 20° C., i.e. less than 10 mg/L.

Embodiment Equipped with a Driving Fluid and a Gasket (FIGS. 3*a* to 3*c*)

In some cases, the miscibility of the driving fluid with the suspension medium or the solubility of compounds of the driving fluid in the particle suspension or of compounds of the particle suspension in the driving fluid is significant or represents a risk of alteration of the particle suspensions. To compensate for these issues, the device of the invention comprises, in certain embodiments, a fluid driven gasket 22 increasing the separation between the driving fluid 32 and the particle suspension 31. In such embodiments, the geometry of the gasket should be compatible with the geometry of the channel 1 and in particular bends, to this extent excessive gasket length should be avoided. Additionally, in any of these embodiments, the pressure difference between the driving fluid 32 and the particle suspension 31 across the gasket 22, notably due to friction forces, should be reasonably low during operation to avoid excessive operating pressures and reduce hysteresis to facilitate device control. In particular, in these embodiments, the pressure difference across the gasket 22 when the fluid on both sides of the gasket is water and the flow rate corresponding to the gasket movement is 10 μL/s should be inferior to 0.5 bars to ensure practical usability of the device. Additionally, in any of these embodiments, it is found preferable that the rotation of the gasket within the channel 1 resulting in its extremity in the longitudinal axis moving from one side to the other be prevented to avoid the corresponding surfaces of the gasket being successively exposed to the driving fluid 32 and the particle suspension 31 in order to reduce the related contamination risk between the two of them. To do so, it is notably possible that the gasket has a slightly elongated shape along the channel longitudinal axis in order to prevent its complete rotation around an axis perpendicular to the channel longitudinal axis.

In some embodiments, the movable gasket 22 forms a loose seal 223 between the particle suspension 31 and the driving fluid 32. These embodiments provide an incomplete separation between the driving fluid 32 and the particle suspension 31 but they may be easier to manufacture and typically involve a lower pressure drop across the movable gasket 22 than in the case of tight seals. In such cases, the cross section of the gasket needs to be smaller than that of the channel in at least a region of the channel in which the gasket is intended to move. The cross section of the gasket should be carefully adjusted to provide the best possible seal, in particular its cross section should be as close as possible to that of the channel in the region where it is intended to move.

In some other embodiments, the movable gasket 22 forms a tight seal 222 between the particle suspension 31 and the driving fluid 32. In some of these embodiments, the tight seal is formed with the help of at least one O-ring or a washer 221, preferably with the help of two O-rings or washers successively positioned along the longitudinal axis of the gasket. These embodiments can be advantageous, notably when the channel walls are quite stiff. The availability of O-rings and more generally washers in considerable variety of materials and geometry facilitates the manufacturing of devices according to these embodiments. In some other embodiments, the tight seal is formed thanks to the deformation of the walls of the channel 1 created by the presence of the gasket 22. Such embodiments may be more challenging to manufacture as they require relatively high precision for both the channel and the gasket geometry to achieve tight seal without excessive pressure drop across the gasket 22 during operations, but they provide an important advantage resulting from wear being distributed over the channel length on the surface of channel walls rather than concentrated on the surfaces of O-rings or washers, which increases the durability and the reliability of the seal 222 formed by the gasket 22.

Embodiment Equipped with Volumetric Graduations

As previously presented, the invention favors the homogeneity of the particle suspension and of its processing, thus allowing better accuracy in the handling of particle suspensions and in particular in terms of the delivered dose of particles. To further improve the accuracy, it is advantageous to embed means for controlling the displaced volume of the particle suspension or the flow rate of the particle suspension.

In some cases, the invention is used manually by operators and a simple visual inspection allows the estimation of the displaced volume of the particle suspension in a quick manner Such situation includes for example the manual manufacturing steps of bioengineered cells. In some embodiments, this is achieved by the channel wall material translucency or transparency, allowing the tracking of the interface 2 between the particle suspension and the driving fluid, and by the provision of volumetric graduations, such as lines and numbers on the outside surface of the channel. Accordingly, in some embodiments, the channel is made of a transparent or translucent material and the device comprises at least five volumetric graduations along the channel length.

It is highlighted that in many embodiments, such as those using commercially available tubing to form the channel 1, the dimensional accuracy of the resulting channel is frequently found to be insufficient for volumetric graduations to be based solely on a linear measurement along the channel length and a calculation based on the nominal cross-section of the channel. Rather it is preferable, and typically necessary, that any volumetric measurement based on the interface position rely on previously performed dedicated calibration. In the embodiments mentioned above, volumetric graduations should be established based on a dedicated volumetric calibration procedure.

It is additionally highlighted that, in order to provide accurate measurement of the volumetric displacement in all cases of use of the invention, the channel 1 should be subjected to relatively small variations of its inner volume during use and in particular due to pressure variations. The channel should in particular be sufficiently stiff or elastic to avoid irreversible inner volume changes following pressurization or depressurization. The material of the tubing should be chosen so that its mechanical properties and dimensions are not significantly altered in condition of use by chemical interactions, swelling or solvation, by compounds of the particle suspension or of the driving fluid. Measurements of the displaced volume of the particle suspension should additionally be performed at the lowest possible pressure value in an application and channels 1 should preferably be stiff to avoid significant volume changes at working pressures. Providing reversible deformations, the impact of these deformations on measurement accuracy can be improved by calibration at multiple internal pressures for a constant external pressure, or as a function of internal and external pressure difference.

In some applications, as previously presented, a gasket 22 is present at the interface 2. In such cases the monitoring of the displaced volume and flow rate can be facilitated by the tracking of the gasket 22 which can be visually more easily identifiable. To this end, the visibility of the particle 21 or gasket 22 may be improved for example by having a bright surface such as a white surface or a light reflecting surface.

Embodiment Equipped with a Tracking System for Tracking the Interface Displacement to Monitor and Control the Displaced Volume and Flow Rate In some other cases, yet higher particle suspension 31 displaced volume or flow rate accuracy than achievable by manual operation is required.

In such cases, the invention is particularly suited to obtain better accuracy than possible with ordinary means of handling suspension due to the fact that the knowledge of the channel cross-section, resulting for example from a calibration operation, makes the position of the interface 2 along the channel length representative of the displaced volume, given the fact that most particle suspensions are essentially incompressible or handled at relatively low pressures. For these particular cases, specifically adapted embodiments according to the invention are presented where the particle suspension displaced volume or flow rate control is assisted.

In some of these embodiments, the channel 1 may be connected to a pump or a pressure controller 61 capable of accurately and promptly applying a specific pressure or flow rate or of accurately displacing a specific volume.

However, such solutions are not always applicable or well suited, for example in the case of the use of a gas mixture as a driving fluid 32. In such cases, it is found advantageous to setup a tracking system 62 for tracking the interface 2 position either directly or via the identification of the position of an interface captive particle 21 or gasket 22. This tracking system 62 can be used, using the knowledge of the cross section of the channel 1, to determine the flow rate and the displaced volume of the particle suspension.

In some embodiments, this tracking system 62 is implemented by an optical system with one or several cameras or other types of light sensors allowing to optically detect the interface 2, the interface captive particle 21 or the gasket 22. In the embodiment implementing the use of an interface, captive particle 21 or a gasket 22, said particle 21 or gasket 22 may advantageously be adapted to create a particularly recognizable visual signal, for example by means of fluorescence obtained for example with a fluorescent coating or sub-coating, light emission obtained for example using a wirelessly powered light emitting diode, or reflective properties such as a mirroring or catadioptric surface.

In one embodiment, the channel 1 is formed in a transparent material with a refractive index preferably close to that of the particle suspension. In this embodiment, the channel may be illuminated under a specific angle to provide a difference in the refraction of incident light by the channel and the particle suspension 31 depending on the presence or absence of the particle suspension 31 at a given point of the channel 1, in which case said difference in the refraction of incident light may be detected by the tracking system 62 to determine at the same point of the channel 1 the presence or the absence of particle suspension 31 in the channel. In this case, the detection of the interface 2 may be, for example, performed by identifying the limit of the part of the channel 1 occupied by the particle suspension 31 by detection of the limit of the area where the light refraction pattern corresponds to the channel 1 being filled by the particle suspension 31.

In some embodiments, the channel longitudinal axis is kept in a single plane over most of the channel length so that one imaging device allows imaging most of the channel in its focal plane. In such embodiments, the imaging device focal plane and imaging field coincide with the planar region occupied by most of the channel longitudinal axis length.

In some embodiments, the illumination of the channel is performed on the side of this planar region opposite from the imaging device, for example by means of a LED array or a display screen such as an LCD screen. In such embodiments, a picture displayed on the screen or a mask interposed between the illumination source and the channel with a particular shape, such as a projection of the channel length, can advantageously selectively illuminate the back of the channel with respect to the imaging device so as to provide a signal easier to be interpreted.

In some other embodiments, the illumination of the channel is performed from the same side of the plane of the longitudinal axis of the channel as the imaging. In these embodiments, the illumination of the channel preferably illuminates the channel under a rather low incident angle to minimize direct reflection toward the imaging device, which is generally found to reduce channel readability. Such incident angle should however not be too small with respect to the channel dimensions and spacing in order to avoid excessive shadow casting between neighbor parts of the channel.

Advantageously, illumination can, in such embodiments, comprise different color sources positioned with different angles, such as red and blue sources illuminating the channel in essentially perpendicular directions. Providing the use of a multicolor imaging device matching the illumination colors (e.g. red, green and blue), the different channels allow to increase the signal interpretability. Indeed, in such embodiments, the contrast between channel regions filled with the particle suspension and the driving fluid is generally greater when the illumination axis is essentially perpendicular with the channel longitudinal axis. By having two different independent illuminations at essentially perpendicular angles, it is possible to have a good signal interpretability across the channel length positioned in the imaging plane despite its direction changes.

In some other embodiments, the tracking system 62 is implemented by measuring an impedance change or another electric or magnetic signal related to the movement of the interface 2. Impedance measurements may for example be sensitive to the interface position due to differences in the compositions of the particle suspension and the driving fluid. Alternatively, an interface captive particle 21 or a gasket 22 may be adapted to create such change in impedance or electric or magnetic signal. For example, the captive particle 21 or gasket 22 may comprise an electrically insulant, electrically conductive, electrically inductive or electrically capacitive part or a part with a permanent magnetic field or diamagnetic, paramagnetic, superparamagnetic or superdiamagnetic properties. In such embodiments, several electronic sensors adapted to be sensitive to the impedance, electric or magnetic properties of the interface, the interface captive particle or the gasket, are placed along the channel length as part of the tracking system 62 for tracking the interface position. Numerical treatment including interpolation and calibration using the signal of several of the sensors may be used to improve the performance of the tracking system 62.

In some other embodiments, the tracking system 62 uses acoustic phenomena. These embodiments are advantageously relatively cheap, compact and easy to implement.

Some embodiments measure the travel time of an acoustic wave along the channel. This travel time depends on the filling of the channel 1, providing different sound velocity in the particle suspension and the driving fluid. Such embodiments may not be preferred as sound wave reflection may be strong on the interface 2, interface captive particle 21 or gasket 22.

Some other embodiments perform echo-location by measuring the travel time of a wave reflected on the interface 2, interface captive particle 21, or gasket 22.

Yet other embodiments determine an acoustic resonance frequency to infer the position of the interface 2; such embodiments may rely on a feed back loop between the acoustic wave sensor and its emitter to automatically amplify resonant frequencies of a certain range. In these embodiments, it is found preferable to exploit acoustic phenomena occurring mostly in the driving fluid as this one is less frequently changed for one with different properties, reducing the need for repeated calibration.

The acoustic wave emitters and sensors used in the tracking system 62 of these embodiments may be one unique component such as a piezo-electric element with ancillary electronics.

In some embodiments, the measurement of the flow rate or displaced volume of the particle suspension 31 is used to adjust the command of a pump or pressure controller 61 connected to the input 11 or to the output 22 of the channel 1. To this end, in some embodiments the device is further equipped with a component 63 connected electronically to the tracking system 62 for tracking the interface 2 position along the channel length and to said pump or pressure controller 61 where said component 63 is capable to command or adjust the command of the pump to obtain a displaced volume or a flow rate closer to a target one.

In the embodiments equipped with a tracking system 62, the volumetric calibration can be performed by a dedicated procedure with a flow meter or a volume measurement device and a pumping unit such as an accurate volumetric pump or a pressure controller. For example, a constant pressure is applied at the channel input using the pressure controller while frequently repeated timed signal records by the tracking device and timed measurements by the volume measurement device or flow meter are performed. In the case of a flow meter, time integration is used to obtain the displaced volume between two time points.

By matching tracking device signal records with volume measurements, possibly using interpolation to compensate for small time difference between the two types of measurements, displaced volume between each tracking system signal record can be inferred. By annotating the list of tracking device successive signal records with displaced volume in comparison with a reference tracking signal record (for example the first one performed), each tracking device signal record becomes representative of a specific displaced volume. In order to then use the system to infer the currently displaced volume of particle suspension, algorithms, using for example distance calculation and/or dichotomy over the displaced volume values, can be used to find in the list of tracking signal records the one most closely matching the currently measured signal. The closest calibration signal record of the tracking device is in principle representative, with an approximation, of the currently displaced volume.

Interpolation between several calibration signal records can be used to further refine displaced volume inference based on the current tracking signal. It is noted that the accuracy of said system can be altered by changes in the properties of the particle suspension with respect to the fluid used during calibration. In the case where strong tracking system signal differences are caused by changes in the particle suspension properties, the method mentioned above can be refined to make it more robust. For example, the frequency or wavelength range or value of the source can be tuned, or the signal can be modified to eliminate certain features (for example elimination of certain time and/or spatial frequencies) which vary the most with changes in particle suspension properties. Preservation of only values or ranges of time and/or spatial frequencies of the tracking device signal can also help decrease the processing power and duration required for displaced volume inference.

Figure 4:
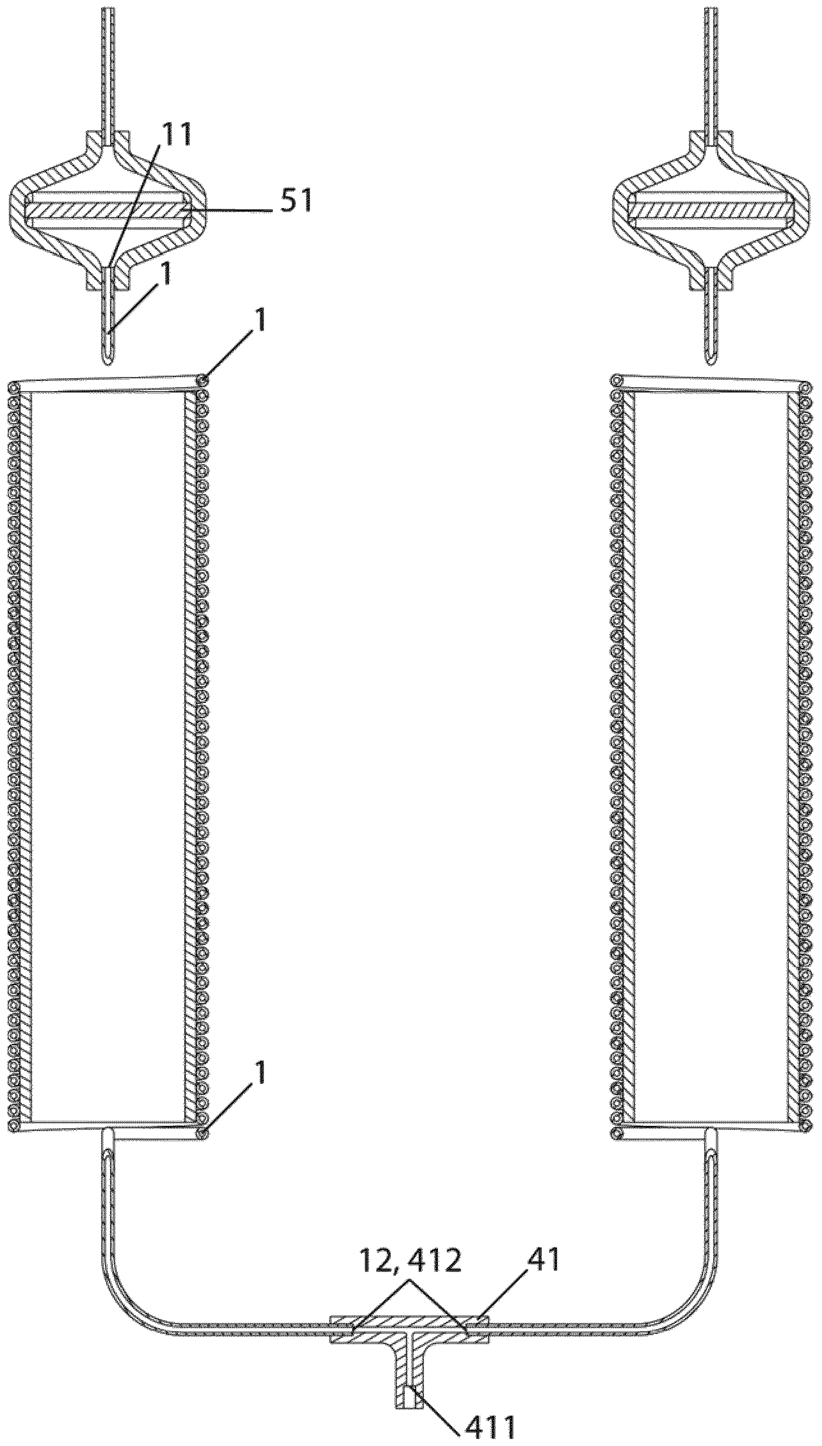
FIG. 4 is a cross section of a device according to an embodiment of the invention being a double coil homogenization device.

Double Coil Homogenization Device (FIG. 4)

In some cases, the homogeneity of the input particle suspension is poor or doubtful, or the output homogeneity of the particle suspension is particularly important. Such cases include for example handling of cell suspension during the manufacturing of cell and gene therapies. In these applications, inaccurate dosing can be responsible for important loss of yield or process duration increase. For these applications, the invention provides particularly improved means for delivering a homogeneous particle suspension. In the embodiment shown in FIG. 4, two channels 1 according to the invention are connected at their output extremities 12 to fluid ports 412 of a manifold 41 equipped with at least three fluid ports such as, for example, a T-junction or a Y-junction, so that the manifold comprises at least one input/output fluid port 411 which can be connected to another device.

In some preferred embodiments, the two channels 1 connected to the manifold 41 are identical in terms of length and cross section. In some preferred embodiments, the two channels 1 are further characterized by similar patterns of compaction.

In these embodiments, the volume of the manifold 41 is preferably reduced and its inner volume connecting its ports has cross sections similar with those of the channels 1.

In these embodiments, the input/output fluid port 411 allows to fill one or two of the channels 1 with a particle suspension 31, and subsequently to homogenize it by flowing the particle suspension 31 in alternative directions between both channels 1 across the manifold 41. During the course of such operation, the variability of the velocity distribution of particles of the suspension 31, favored by mixing effects such as those induced by Dean flow, leads to a homogenization of the particle suspension 31 over the length of both channels 1. Because the average velocity of particles may be superior, or more rarely inferior, to the average flow velocity, homogenization is improved by starting this alternative flow with displaced volumes representing a relatively large fraction of the particle suspension volume in the device, for example 80% of the volume of the particle suspension 31, and then subsequently reducing the magnitude of these oscillations in terms of displaced particle suspension 31 volume. For example, the displaced volume may decrease by between 0.1 and 10% per oscillation. The flow rate of these oscillations may be adjusted, notably to favor dominant inertial lift effects. Additionally, the flow rate may be varied over the course of the homogenization operations. Over the course of such operations, it is preferable to maintain the suspension in average centered with respect to the manifold 41, which facilitates recollection from both channels 1 after homogenization. These homogenization operations may be repeated, in particular they may be reproduced before each output of particle suspension from the device. During the output of particles from the device, the suspension may be recovered from one or two channels 1 successively or simultaneously.

In some of these embodiments, at least one pump or pressure controller 61 is connected to the input 11 of one of the channels 1 to drive the driving fluid 32 and drive the flow of the particle suspension 31 for the handling and in particular the homogenization operations. In a preferred set of these embodiments, the pump 61 is separated from the input of the channel to which it is connected to by a filter 51 of pore diameter inferior to 1 μm, preferably by a filter of pore diameter inferior to 0.5 μm, and more preferably by a filter of pore diameter of the order of or inferior to 0.2 μm. In a preferred set of these embodiments, both inputs 11 of the channels 1 are connected to a pump or a pressure controller 61.

In some specific cases, the accuracy of the dosing of the particles of the suspension must be high, for example when a precise number of particles needs to be delivered to another container or device. In such cases, statistic fluctuations of cells in a sample volume can be a critical source of errors of particle dosing. In such applications, the embodiment presented above may prove insufficient to meet the required precision, notably due to said statistic fluctuations. Thus, to achieve such precision in delivered particle number, the device may additionally comprise, according to some embodiments, a particle counter, which is preferably positioned close to the recipient volume, by default in the manifold 41. Such particle counter may be based, for example, on optical detection of particles. The command of a pump, valve or other means controlling the particle suspension transfer is then preferably done by a control module connected to the particle detector in order to adjust the delivered volume so as to deliver as precisely as possible a target number of particles. Such a control module typically comprises an electronic board which controls the command of the pump or valve according to the detected number of particles. Because the flow rates required to obtain high inertial forces are relatively high, particularly fast processors, such as FPGA calculators, may be necessary for this control module to respond quickly enough. Additionally, a channel length between the particle counting site and the target container of the transfer may be used to create a long enough frame of response of the command. It is noted however that said channel length increases the uncertainty of the particle dose as particle travel in suspension is relatively difficult to predict accurately and should as such be no longer than necessary to provide sufficient delay for counting and actuation.

Embodiments for Low Temperature Storage of the Particle Suspensions

In certain cases, particle suspensions 31 are stored at low temperature, possibly leading to the freezing of the suspension medium, to stabilize them. A notable example of this situation is the cryopreservation of cell suspensions which is most often performed in a suspension medium comprising a fraction of cryoprotectant, typically 10% of DMSO (dimethyl sulfoxide). The invention provides particular advantages to these applications, notably due to the fact that aggregation risk is reduced, which is ordinarily a common source of performance loss or variability in these applications.

The invention provides embodiments specifically adapted to these applications, allowing high performance handling of the suspension as well as good capabilities to control the suspension temperature and sustain low storage temperatures.

In some embodiments, the channel 1 sustains long term exposure to −70° C. when filled with a 10% solution of DMSO (dimethyl sulfoxide) in water. This means that if the channel is filled with a 10% solution of DMSO in water and stored at −70° C. for 24 hrs, then warmed up by exposure to air (for example at 20° C. and 1 bar) without particular convection, the channel is subsequently not leaking or broken when pressurized with the same solution at 1 bar above the ambient pressure. To achieve such performances, the channel 1 may for example be made of a circular cross-section tubing made of polyethylene, PTFE, (Polytetrafluoroethylene) or FEP (Fluorinated Ethylene Propylene) of wall thickness of at least half of the tube internal diameter.

In some embodiments, the channel 1 sustains long term exposure to −140° C. when filled with a 10% solution of DMSO in water. This means that if the channel is filled with a 10% solution of DMSO in water and stored at −140° C. for 24 hrs, then warmed up by exposure to air (for example at 20° C. and 1 bar) without particular convection, the channel is subsequently not leaking or broken when pressurized with the same solution at 1 bar above the ambient pressure. To achieve such performances the channel may for example be made of a circular cross-section tubing made of polyethylene, PTFE or FEP of wall thickness of at least half of the tube internal diameter.

In some embodiments, the wall material of the channel 1 does not absorb the DMSO possibly contained in the suspension medium to an extent likely to significantly alter the cryoprotectant effect on particle suspension and in particular cell suspension. In particular, these embodiments are characterized in that when filled with a 10% DMSO solution in water, after being left to rest for 6 hours at 20° C., the recollected solution has a concentration in DMSO differing from 10% by less than 1%.

Embodiments Allowing to Protect the Particle Suspension from Contamination

In many cases, the particle suspension must be protected from contaminants, in particular from airborne contaminants. This is especially frequent and important in the case of cell suspensions. In such cases, it is important to provide means to protect the particle suspension during the transfer or seal the channel volume from contacts with the environment.

To this end, in some embodiments according to the invention, the device is further characterized by the channel being heat-sealable at at least its output 12, or is equipped with a set of caps and/or swabbable valves and/or other types of septa allowing at least to close its output 12. In a preferred set of embodiments, the channel 1 is further heat-sealable at its input 11 or equipped with a set of caps allowing to close its input 11.

To protect the particle suspension from contamination which may occur before the device filling with the particle suspension, the device is, in some embodiments, prepared clean in a sealed packaging such as a thermally welded bag 43 of porosity inferior to 1 μm, preferably inferior to 0.5 μm, and more preferably inferior to 0.2 μm. In a subset of these embodiments, the device is sterilized within this packaging 43 by gamma ray, steam, ethylene oxide or any other suitable mean of sterilization possibly followed by a neutralization or drying step prior to being delivered for use.

Embodiments Allowing to Transfer the Suspension Through a Needle

In some cases, the particle suspension needs to be sampled or delivered through a needle. Exemplary cases include the transfer from or to vials capped with seals meant to be pierced by a needle. In such cases, the flow rates are generally limited by the small internal diameter of the needle and the suspension viscosity or its sensitivity to shear or turbulence. In such cases, the sedimentation forces are particularly often source of performance losses with ordinary devices due to the fact that at reduced flow rates inertial lift forces are weaker. Accordingly, the comparative advantages of the invention are great in these applications.

As such, in some embodiments specifically adapted to these applications, the channel output 12 is connected to a needle of internal diameter comprised between 100 μm and 1 mm. For particularly high performances, volumes on the fluidic path between the needle and the channel 1 should not have cross-sections much larger than the average representative cross section of the channel so as to avoid that, in such volumes, sedimentation effects be dominant. As such, in some preferred embodiment, the fluidic path between the needle and the channel 1 does not comprise segments representing an inner volume greater than 1 mL with an average cross section of this segment greater than twice the average cross section of the channel, preferably no such segment represent a volume of more than 250 μL and more preferably no such segment represents a volume of more than 50 μL, and even more preferably no such segment represents a volume greater than 10 μL. In some of these embodiments, it is found advantageous that the needle be attached to the channel forming a rigid assembly so as to notably allow handling of the device more easily and possibly with one hand only to maintain the assembly in position. In some other embodiments, it is found advantageous that a free length of tubing, ideally extending the channel 1, links the needle to the remaining of the channel, notably when the device is also connected to other devices such as filters and pumps or pressure controllers in order to facilitate manipulation of the device and in particular its connection to other containers.

Figure 5:
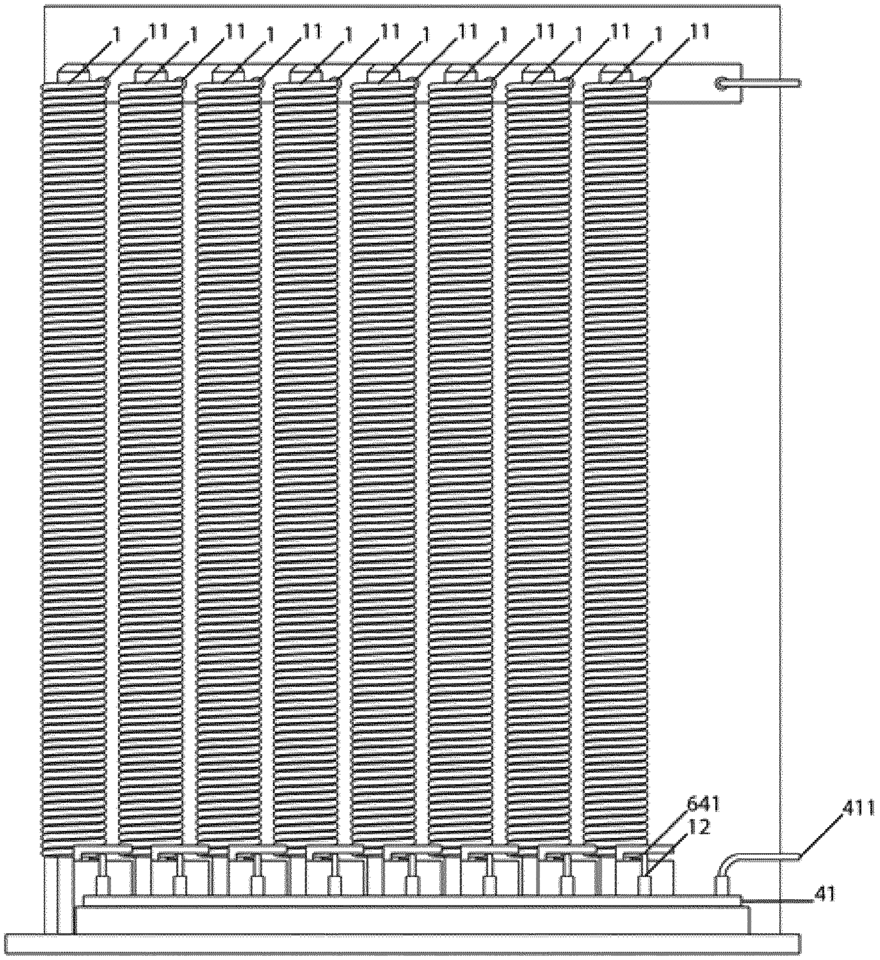
FIG. 5 is a side view of a device according to a high-volume embodiment of the invention comprising a plurality of channels each compacted in the form of a coil.

High Volume Embodiments (FIG. 5)

The performance of the device is generally better in the subrange of cross sections ranging from 0.1 $mm^2$ and 3 $mm^2$, and sometimes even better in the subrange between 0.1 $mm^2$ and 2 $mm^2$. However, the hydraulic resistance scales as the inverse power four of the cross section representative diameter for a fixed geometry channel, for example a circular cross-section channel. In addition, particle suspensions typically have viscosity similar to or greater than that of water and volumes of particle suspension to be involved can be large, for example greater than 1 mL, greater than 5 mL, greater than 10 mL, greater than 50 mL, greater than 100 mL and sometimes greater than 250 mL. For such volumes, the hydraulic resistance of the channel can complexify operations and lead to working pressures, at the application flow rates or at flow rates required to obtain sufficiently strong inertial lift effects to resuspend particles, of more than several bars and sometimes of more than 10 bars. Such high pressures are preferably avoided due to the various technical and practical inconveniences including risks of alteration of the particle suspension, in particular in the case of suspensions containing compressible particles, risks of leaks, risks of projections, among others. To benefit from the advantages of the invention without suffering from these inconveniences when handling particularly viscous and/or high volumes of suspension, the invention comprises a set of specifically adapted embodiments. In said embodiments, several channels 1 according to the invention are connected at their output extremity 12 to a hydraulic manifold 41. In these embodiments, the number of channels connected to the hydraulic manifold is adjusted to meet the volume required by the application with the length of each individual channel connected to the manifold limited to a value based on a limitation of the operating pressure based on estimates taking into account the application flow rates or the flow rates required to obtain particle resuspension thanks to inertial lift effects, the estimate of the viscosity of the suspension, the viscosity of the driving fluid, and the pressure difference across the interface.

In some embodiments, the sum of the volumes of the channels 1 connected to the manifold 41 is greater than 1 mL. In some preferred embodiments, the sum of the volumes of the channels 1 connected to the manifold 41 is greater than 5 mL. In some preferred embodiments, the sum of the volumes of the channels 1 connected to the manifold 41 is greater than 10 mL. In some preferred embodiments, the sum of the volumes of the channels 1 connected to the manifold 41 is greater than 20 mL. In some preferred embodiments, the sum of the volumes of the channels 1 connected to the manifold 41 is greater than 50 mL. In some preferred embodiments, the sum of the volumes of the channels 1 connected to the manifold 41 is greater than 100 mL. In some preferred embodiments, the sum of the volumes of the channels 1 connected to the manifold 41 is greater than 250 mL.

In some preferred embodiments, to favor a homogeneous handling of the suspension, each channel 1 connected to the manifold 41 preferably has similar compaction pattern and cross section profile along its length.

In some preferred embodiments, in order to prevent loss of particles or heterogeneity of the suspension handling in the manifold, the manifold has cross section properties consistent with those of the channels, i.e. the average cross-sections of fluid paths in the manifold are similar to those of the channels. Additionally, also in order to prevent loss of particles or heterogeneity of the suspension handling in the manifold, the manifold preferably does not comprise a fluid path segment of cross section greater than four times that of one channel 1 which represents a volume of more than 250 μL and more preferably no such segment represents a volume of more than 50 μL, and even more preferably no such segment represents a volume greater than 10 μL.

To operate this embodiment, the input 11 of each of the channels 1 may be connected to pumps or pressure sources, preferably via filters avoiding contaminations. As a variant, the manifold can be connected to another device and height difference or pumping from this device can drive the flow. Alternatively, each channel 1 may comprise a fluid driven gasket 22 with two bottlenecks limiting the gasket movement along each channel length to limit the displaced volume in each channel. However, several cases and technical aspects make it preferable to be able to drive the suspension volumetric displacement in each channel 1 individually. One such important technical aspect is that the hydraulic resistance of the channel may significantly differ, making the collective handling of channels result in loss of part of the particle suspension for example in a channel with higher hydraulic resistance during suspension output. This aspect is particularly true in the case of the use of fluid driven gasket forming a tight seal. Another important technical aspect to consider is that the flow rate of the application being given, the higher inertial lift forces and thus generally the best particle suspension handling is going to be obtained when one channel is driven at a time. As such, is some embodiments, the flow rate in the channels 1 can be independently driven.

In some embodiments, such independent driving of flow rate in channels is achieved by means of each channel 1 input 11 being connected to a different pump or pressure controller.

In some embodiments, such independent driving of flow rate in channels 1 is achieved by means of valves with one valve 64 in each channel or in its connection line with the manifold. For example, the channel may be connected to the manifold via a flexible tubing section, in which case a pinch valve 641 may be used to block the flow in this channel by pinching the flexible tubing section. In such configurations, all channels 1 may be driven by the same pump or pressure controller, which can be advantageous in terms of cost and complexity of implementation.

In some other embodiments, such independent driving is achieved by valves connected to the input 11 of each channel. For example, each channel may be connected to a filter output with a pore diameter inferior to 1 μm, preferably a filter of pore diameter inferior to 0.5 μm, and more preferably a filter of pore diameter of the order of or inferior to 0.2 μm—and the filter output may be connected, via solenoid driven gas valve 642, to a pump or a pressure controller 61. In such configurations, all channels 1 may be driven by the same pump which can be advantageous in terms of cost and complexity of implementation, and the pump may be a gas pump if the driving fluid is a gas mixture, which can be particularly cheap and reduce operating pressure. Additionally, these embodiments are advantageous in the cases where the channels 1 are renewed after a number of use or after each use. Indeed, in such cases, the channels 1 may be attached to the filters and the manifold and more easily removed and installed than in cases where valves interrupt the flow between the channels 1 and the manifold. It is noted, however, that in such configuration the possible compressibility of the driving fluid, or the lack of stiffness of the channel walls, may result in some flow in some channels while one channel is being pressurized.

Figure 6:
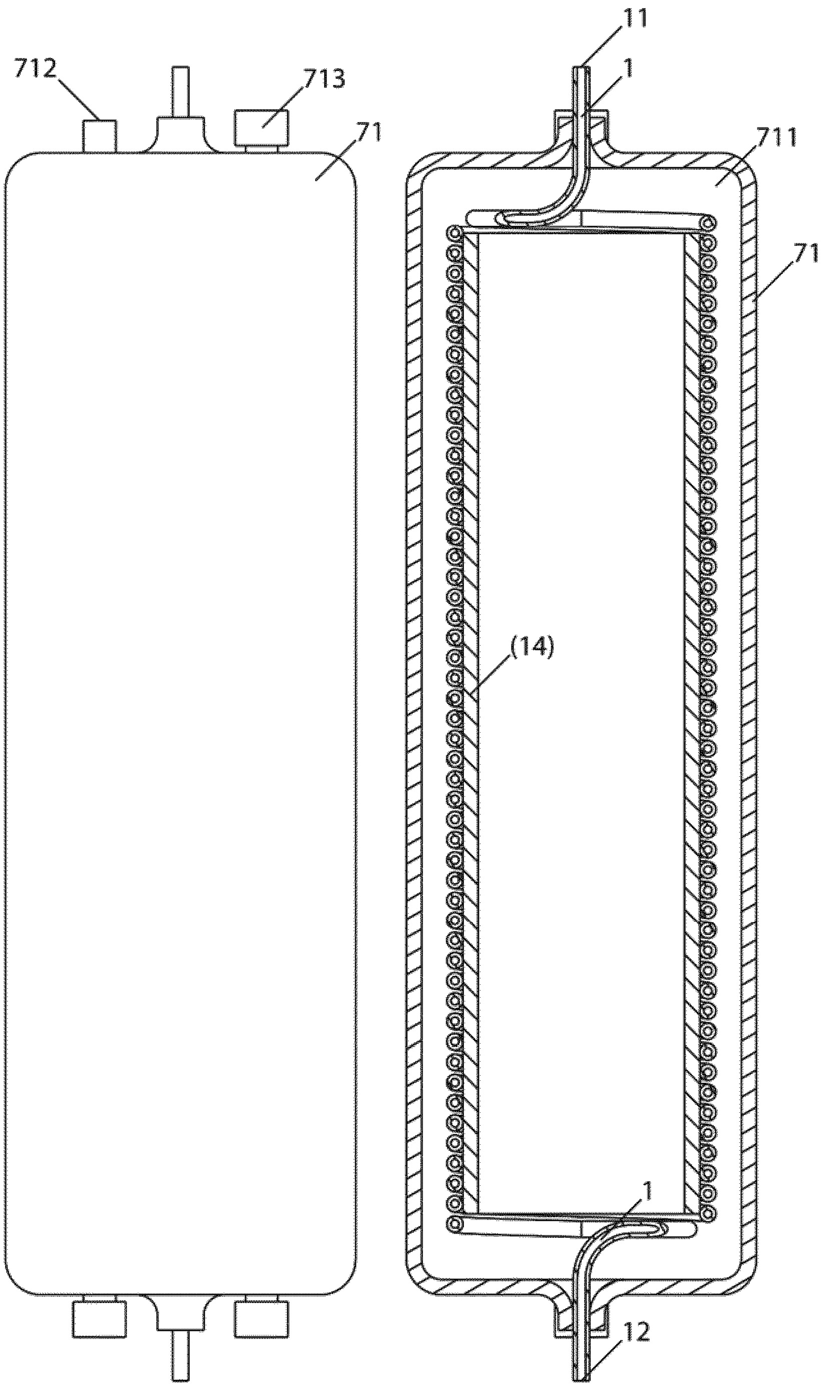
FIG. 6 is a side view and a cross section of a device according to an embodiment of the invention improving the temperature control of the particle suspension.

Embodiment Improving the Temperature Control of the Particle Suspension (FIG. 6)

In some cases, the particle suspension 31 temperature needs to be maintained or controlled to achieve better handling performances. These cases are particularly frequent in the case of cell suspensions, for which maintaining a low temperature such as 4° C. for example may decrease cell mortality for relatively long handling durations, for example handling durations longer than 10 minutes. In some cases, cells suspensions are frozen to improve preservation over periods exceeding 3 hours, more typically for periods exceeding 6 hours. In such cases, the temperature decrease of the suspension is preferably well controlled for the freezing, while the temperature increase is preferably fast for the thawing, in order to increase the yield and in particular decrease the cell mortality related to these operations. In these various applications, the invention has supplementary advantages, notably the increased ease of controlling the particle suspension 31 temperature due to the reduced particle suspension 31 volume cross-section, decreasing duration of thermal transfer and increasing temperature homogeneity due to faster diffusion.

Certain aspects of the invention have particular advantages for such cases by allowing efficient and good thermal exchange between the particle suspension 31 and a "temperature control fluid" 70 used either to vary the temperature of the particle suspension 31 by thermal exchange across the walls of the channel 1 or to increase the thermal inertia associated with the suspension 31 to stabilize its temperature, notably for transport operations where active means for controlling the temperature such as heat pump are preferably avoided to ease operations, notably in terms of costs, complexity and device weight. Certain aspects of the invention have complementary advantages for these applications by providing a thermal insulation 72 between the suspension volume and the environment. Particularly advantageous combinations comprise both a good thermal exchange with a temperature control fluid 70 increasing the thermal inertia around the particle suspension, and a thermal insulation layer 72 insulating both the particle suspension and said temperature control fluid 70 synergically increasing the thermal stability of the particle suspension relative to environmental perturbations.

Accordingly, in some embodiments, at each point of the cross section over of the channel 1 on at least half of the length of the channel 1, the thickness of the channel 1 wall is at least on one side inferior to 3 mm, to provide a good thermal contact with a temperature control fluid 70 outside the channel. In some embodiments, at least half of the channel length is placed in an enveloping fluid-tight container 71 equipped with at least one, and preferably at least two, fluid ports 712 which can be closed by sealing, caps, swabbable valves, septa or similar means 713, so that such container can be filled with a temperature control fluid 70 to increase the device thermal inertia in the vicinity of the channel 1, or so that the temperature of the particle suspension 31 within the channel 1 can be driven by in and out flow of the temperature control fluid 70 in this container 71.

Accordingly, in some embodiments, an insulating layer 72 is wrapped around the channel or around the container containing the channel to decrease the influence of the environment on the particle suspension temperature.

In some of these embodiments, the tubing support 14 is advantageously rigidly attached to the temperature control fluid container 71 to form a stable assembly and reduce the potential consequences of arrangement variations during device handling.

Figure 7:
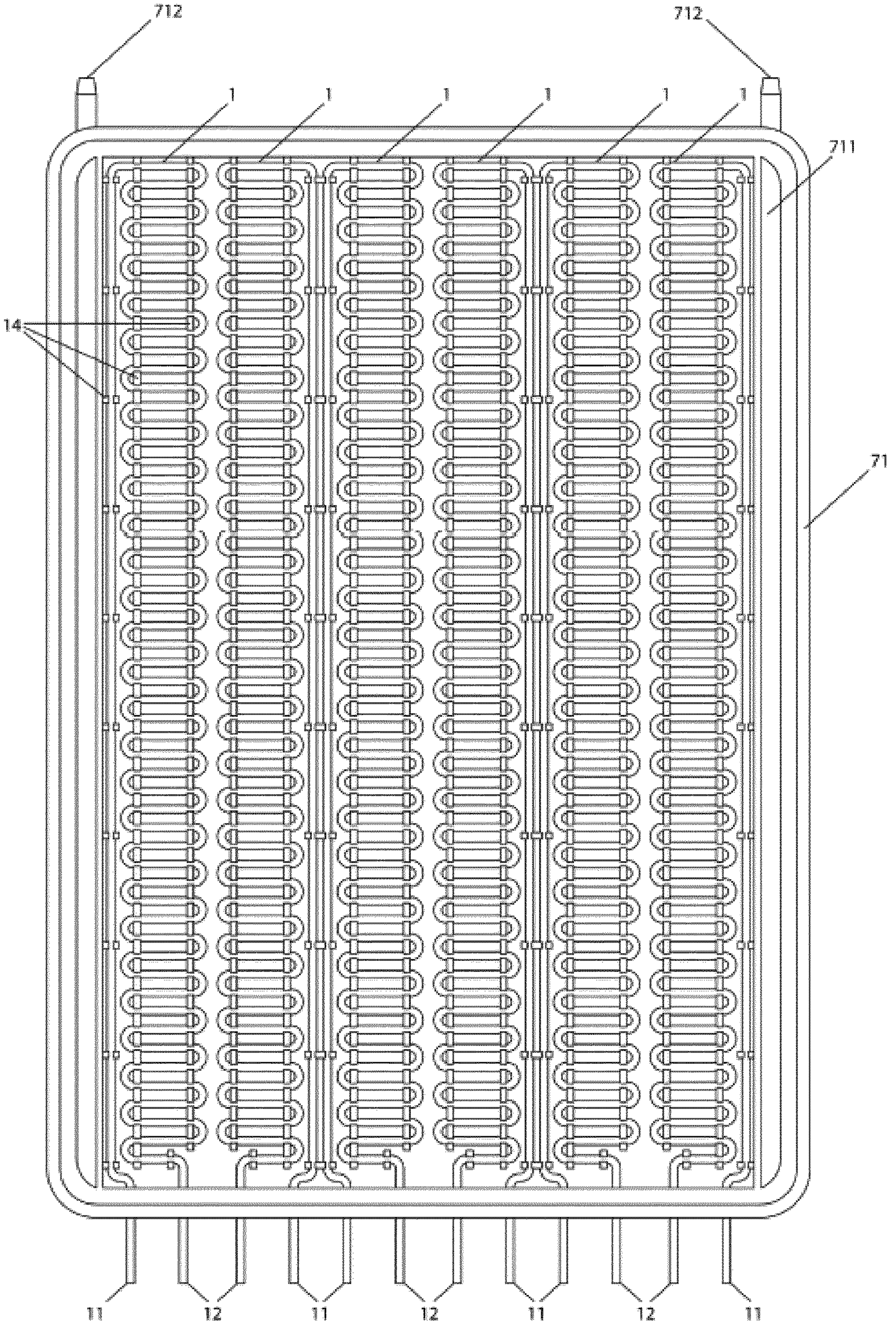
FIG. 7 is a side view of a device according to a high-volume embodiment of the invention comprising a plurality of channels each compacted in the form of a zig-zag pattern.

Embodiment with a Channel Compacted in the Form of a Zig-Zag Pattern (FIG. 7)

The embodiment shown in FIG. 7 is a high-volume embodiment analogous to that of FIG. 5. The embodiment shown in FIG. 7 differs from the embodiments shown in the other figures in that each channel 1 is compacted in the form of a zig-zag pattern instead of a coil.

In this embodiment, the channels 1 are arranged in a single plane, which facilitates the imaging and thus the monitoring of the position of the interface 2. The zig-zag pattern is regular so as to promote homogenization of the particle suspension when using the device. In this embodiment, the channels 1 are tubes that are fixed at regular intervals on support elements 14, making it possible to assign a fixed arrangement to the tubes, which is essential functionally to have a reliable and reproducible correspondence between the position of the detected position of the interface 2 and the displaced volume of the particle suspension. The tubes and support elements 14 are inserted into a cartridge 71 which can be filled with a liquid 711 such as water and closed by a transparent front panel (not shown in FIG. 7) so that it is possible to image and monitor the position of the interface 2 through the front panel. The cartridge 71 is connected to a circulation of liquid via the connections 712. The inside of the cartridge 71 contains passages for the liquid (corridors and fenestrations) favoring a circulation of liquid in the whole of the cartridge and thus a convective exchange in the entire device.

Methods

The phenomena interfering with cell transfer operations are multiple and complex. It is desirable to optimize several aspects of the transfer operations to get the best performance Some improvement can be obtained by reducing resting times, which generally cause sedimentation-induced adverse effects, or by adjusting the medium content, density and viscosity to favor cell survival and limit sedimentation, among others. The temperature at which the transfer is performed can also be adjusted, for example lower temperature can preserve cells from dying during the transfer in certain cases. However, the medium content, density, viscosity and temperature are often constrained by other aspects of the process so that they do not generally solve the problems encountered in the transfer of cell suspension.

The methods of the invention involve a particle suspension 31, typically an aqueous cell suspension, and a preferably sterile driving fluid 32 which can for example be a gas mixture such as air; or an aqueous solution; or an oil mixture which is not miscible in water. A device according to the invention is used. The transferred media is loaded in the device by the movement of the interface 2 toward the input side of the channel. The transferred media is unloaded from the device by displacement of the interface toward the output side of the channel.

In loading and unloading operations, and possibly during resting time between such operations, flow rates within an appropriate range have to be applied for a minimal duration to provide resuspension effects and avoid the detrimental effects of sedimentation. The magnitude of this re-suspending flow rate depends on the channel cross section. The magnitude of the re-suspending flow rate additionally depends on transferred media viscosity, density difference between cells and the transfer media, magnitude of gravity and particle diameter. In general, it is found that the applied flow rate should be at least for a period of 1 second greater than $Kq \times S^{3/2}$ μL/s where Kq is equal to ⅓ μL/s/mm$^3$ and S is the channel average cross section expressed in mm$^2$.

Flow rate pulses can be performed regularly in alternated directions to maintain the particles in suspension. In this case, it is advantageous to repeat the resuspension flow rate pulses at least every minute.

In the case of embodiments comprising two or more channels, it is noted that flow pulses preventing sedimentation can be performed even during input or output operations, in particular when two independent pumps or pressure controllers are used.

The invention claimed is:

1. A device for handling a particle suspension comprising:

i. at least one channel for flowing the particle suspension, wherein the channel has an average cross-section comprised between 0.1 mm$^2$ and 9 mm$^2$ and a standard hydraulic resistance of less than 1013 Pa·s/m$^3$, wherein at least a portion of the channel representing half of the length of the channel is compacted in such a way that the largest distance between two points of the volume occupied by the portion of the channel is less than half of the total length of the channel;

ii. a pumping unit configured to move a driving fluid for driving the particle suspension in the channel, wherein the driving fluid is separated from the particle suspension by an interface; and iii. control means for programmed to control the pumping unit as a function of the position of the interface along the channel, the position of the interface being monitored and/or, in the case of an incompressible driving fluid, determined from the volume of the driving fluid injected in the channel by the pumping unit.

2. The device according to claim 1, wherein the driving fluid is compressible.

3. The device according to claim 1, wherein the interface between the driving fluid and the particle suspension is formed by a contact surface between the driving fluid and the particle suspension, the inlet of the channel being connected to a filter having a pore diameter less than or equal to 1 μm.

4. The device according to claim 1, wherein the device comprises a fluid driven gasket in the channel, in such a way that the interface between the driving fluid and the particle suspension is formed by the fluid driven gasket.

5. The device according to claim 1, wherein the device comprises calibrated volumetric graduations along the channel establishing a relationship between a position along the channel and a displaced volume of the particle suspension.

6. The device according to claim 1, wherein the channel is transparent or translucent.

7. The device according to claim 1, wherein, over at least 10% of its length, the channel is curved with a radius of curvature comprised between 2 mm and 50 mm.

8. The device according to claim 1, wherein the channel is configured to sustain a pressurization with water of at least 0.5 bars above the ambient pressure without breakage and with a leak or permeation flow of the channel inferior to 60 μg/min per mL of the total channel volume filled with water.

9. The device according to claim 1, wherein one end of the channel is connected to the pumping unit, and the pumping unit is capable of creating a pressure variation of at least 0.5 bar.

10. The device according to claim 1, wherein the channel is placed within a fluid-tight container filled with a high thermal inertia fluid, or the channel is contained within a layer of thermally insulating material.

11. The device according to claim 1, comprising at least two channels connected to a manifold at their outlets.

12. The device according to claim 1, wherein the driving fluid is a gas.

13. A method for handling a particle suspension comprising flowing the particle suspension in or out of at least one channel by means of a driving fluid for driving the particle suspension in the channel, wherein the driving fluid is separated from the particle suspension by an interface, wherein the channel has an average cross-section comprised between 0.1 $mm^2$ and 9 $mm^2$ and a standard hydraulic resistance of less than $10^{13}$ $Pa \cdot s/m^3$, and at least a portion of the channel representing half of the length of the channel is compacted in such a way that the largest distance between two points of the volume occupied by the portion of the channel is less than half of the total length of the channel, the method comprising moving the driving fluid by means of a pumping unit and controlling the pumping unit as a function of the position of the interface along the channel, the position of the interface being monitored and/or, in the case of an incompressible driving fluid, determined from the volume of the driving fluid injected in the channel by the pumping unit.

14. The method according to claim 13, wherein the driving fluid is compressible.

15. The method according to claim 13, wherein the flow rate for flowing the particle suspension in or out of the channel is, for at least one period of one second, greater than $Kq*S^{3/2}$ mL/s, where Kq is equal to ⅓ $mL/s/mm^3$ and S is the average cross section of the channel expressed in $mm^2$.

16. The method according to claim 13, wherein the step of flowing the particle suspension in or out of the channel is carried out by applying pulses of flow in opposite directions in the channel, each pulse having a duration of at least one second and a flow rate greater than $Kq*S^{3/2}$ mL/s, where Kq is equal to ⅓ $mL/s/mm^3$ and S is the channel average cross section expressed in $mm^2$.

17. The method according to claim 13, wherein position of the interface along the channel is monitored visually.

18. The method according to claim 13, wherein position of the interface along the channel is monitored by means of a tracking system.

19. The method according to claim 13, wherein the driving fluid is a gas.

* * * * *